United States Patent [19]
Hong et al.

[11] Patent Number: 5,208,763
[45] Date of Patent: May 4, 1993

[54] METHOD AND APPARATUS FOR DETERMINING POSITION AND ORIENTATION OF MECHANICAL OBJECTS

[75] Inventors: Jiawei Hong; Xiaonan Tan, both of Brooklyn, N.Y.

[73] Assignee: New York University, New York, N.Y.

[21] Appl. No.: 582,582

[22] Filed: Sep. 14, 1990

[51] Int. Cl.$^5$ .................. G01B 5/20; G06F 15/46
[52] U.S. Cl. .................. 364/551.02; 364/559; 364/474.36; 364/474.34
[58] Field of Search .................. 364/551.01, 559, 560, 364/577, 578, 579, 580, 474.01, 474.02, 474.05, 474.15, 474.22, 474.23, 474.24, 474.25, 474.31, 474.34, 474.35, 474.36, 474.37, 191, 551.02, 571, 513, 148, 150, 167.01; 33/503, 504; 401/9, 10, 16

[56] References Cited

U.S. PATENT DOCUMENTS

| | | | |
|---|---|---|---|
| 3,633,011 | 1/1972 | Bederman et al. | 364/474.36 |
| 3,670,153 | 6/1972 | Rempert et al. | 364/468 |
| 4,030,201 | 6/1977 | Possati | 33/504 |
| 4,181,958 | 1/1980 | Juengel et al. | 364/560 |
| 4,221,053 | 9/1980 | Bobel, II et al. | 33/552 |
| 4,241,509 | 12/1980 | Possati | 33/505 |
| 4,296,474 | 10/1981 | Hurt | 364/560 |
| 4,370,721 | 1/1983 | Berenberg et al. | 364/560 |
| 4,390,955 | 6/1983 | Arimura | 364/490 |
| 4,547,800 | 10/1985 | Masaki | 358/101 |
| 4,740,902 | 4/1988 | Yoneda et al. | 364/474.06 |
| 4,754,417 | 6/1988 | Beeson et al. | 364/560 |
| 4,780,617 | 10/1988 | Unatate et al. | 364/559 |
| 4,807,152 | 2/1989 | Lane et al. | 395/82 |
| 4,811,253 | 3/1989 | Johns | 364/560 |
| 4,833,630 | 5/1989 | Braman et al. | 364/559 |
| 4,835,718 | 5/1989 | Breget et al. | 364/560 |
| 4,862,377 | 8/1989 | Reedman et al. | 364/559 |
| 4,866,643 | 9/1989 | Dutler | 364/560 |
| 4,901,256 | 2/1990 | McMurty et al. | 364/560 |
| 4,918,627 | 4/1990 | Garcia et al. | 364/551.02 |
| 4,945,493 | 7/1990 | Huang et al. | 364/191 |
| 5,001,647 | 3/1991 | Rapiejko et al. | 364/559 |

OTHER PUBLICATIONS

Gunnarsson, K. T.; Prinz, F. B., "CAD Model-Based Localization of Parts in Manufacturing", Computer, Aug. 1987, pp. 66–74.

Gordon, S. J.; Seering, W. P., "Real-Time Part Position Sensing", *IEEE Trans. on Pattern Analysis and Machine Intelligence*, vol. PAMI-10, No. 3, May 1988.

Grimson, W. E. L.; Lozano-Perez, T., "Model-Based Recognition and Localization from Sparse Range or Tactile Data", *The Int'l Journal of Robotics Research*, Fall 1984, pp. 3–35.

Gaston, P. C.; Lozano-Perez, T., "Tactile Recognition and Localization Using Object Models: The Case of Pollyhedra on a Plane", *IEEE Trans. on Pattern Analysis and Machine Intelligence*, vol. PAMI-6, No. 3 May 1984, pp. 257–265.

Faugeras, O. D.; Herbert M., "A 3-D Recognition and Positioning Algorithm Using Geometrical Matching Between Primitive Surfaces", *Proc. Eighth Int'l Joint Conf. on Artificial Intelligence*, Aug. 1983, pp. 996–1002.

Faugeras, O. D.; Herbert, M.; "The Representation, Recognition, and Locating of 3-D Objects", *The Int'l Journal of Robotics Research*, Fall 1986, pp. 27–52.

Booles, R. B.; Horaud, P.; Hannah, M. J., "3DPO: Three Dimensional Part Orientation System", *Robotics Research: The First Symposium*, Cambridge, Mass.: MIT Press 1984.

(List continued on next page.)

Primary Examiner—Parshotam S. Lall
Assistant Examiner—Michael Zanelli
Attorney, Agent, or Firm—Pennie & Edmonds

[57] ABSTRACT

A computer-controlled machine equipped with sensors determines position and orientation of a workpiece, with respect to a model of the workpiece, which is stored in a data processing system interfaced to the machine, by measuring coordinates of points on the surfaces of the workpiece and determining a transformation in which a sum of squared distances from the points to the corresponding surfaces of the model is minimized. The determined transformation is improved so as to satisfy the specified tolerances.

47 Claims, 23 Drawing Sheets

OTHER PUBLICATIONS

Horaud, P.; Booles, R. B., "3DPO's Strategy for Matching Three-Dimensional Objects in Range Data", *Proc. IEEE* 1984 *Int'l Conf. Robotics,* Atlanta, Ga., Mar. 1984, pp. 78-85.

Stockman, G., "Object Recognition and Localization via Pose Custering", *Computer Vision, Graphics and Image Processing,* vol. 40, 1987, pp. 261-387.

Stockman, G.; Esteva, J. C., "Use of Geometrical Constrains to Determine 3-D Object Pose," *Proc. 7th Int'l Conf. on Pattern Recognition,* Montreal, Canada, 1984 pp. 742-744.

Linnainmaa, S.; Harwood, D.; Davis, L. S., "Triangle-Based Pose Determination of 3-D Objects", *Int'l Conf. on Pattern Recognition,* 1986, pp. 116-118.

G. Stockman, et al. "Three-D Object Pose from Clustering with Multiple Views" *Pattern Recognition Letters,* Jul. 1985, vol. 3.

Silberberg, T. M.; Harwood, D.; Davis, L. S.; "Object Recognition Using Oriented Model Points", *Computer Vision and Image Processing,* vol. 35, 1986, pp. 47-71.

"Optimal Object Localization Using Dual Number Quaternion" SPIE vol. 1095, *Applications of Artificial Intelligence,* VII (1989).

Bolle, R. M.; Cooper, D. B., "On Optimally Combining Pieces of Information, with Application to Estimating 3-D Complex-Object Position from Range Data", *IEEE Trans. on Pattern Analysis and Machine Intelligence,* vol. PAMI-8 No. 5, Sep. 1986, pp. 619-638.

Shekhar, S.; Khatib, O.; Shimojo, M., "Sensor Fusion and Object Localization", *IEEE Int'l Conf. Robotics and Automation,* San Francisco, Calif. 1986, pp. 1623-1628.

Schneiter, J. L., "An Objective Tactile Sensing Strategy for Object Recognition and Localization", *Proceedings of the IEEE Conference on Robotics and Automation,* (1986), pp. 632-637, 1986.

Ellis, R. E.; Riseman, E. M.; Hanson, A. R., "Tactile Recognition by Probing: Identifying a Polygon on a Plane", *Proceedings of the AAAI Conference* (1986), pp. 632-637, 1986.

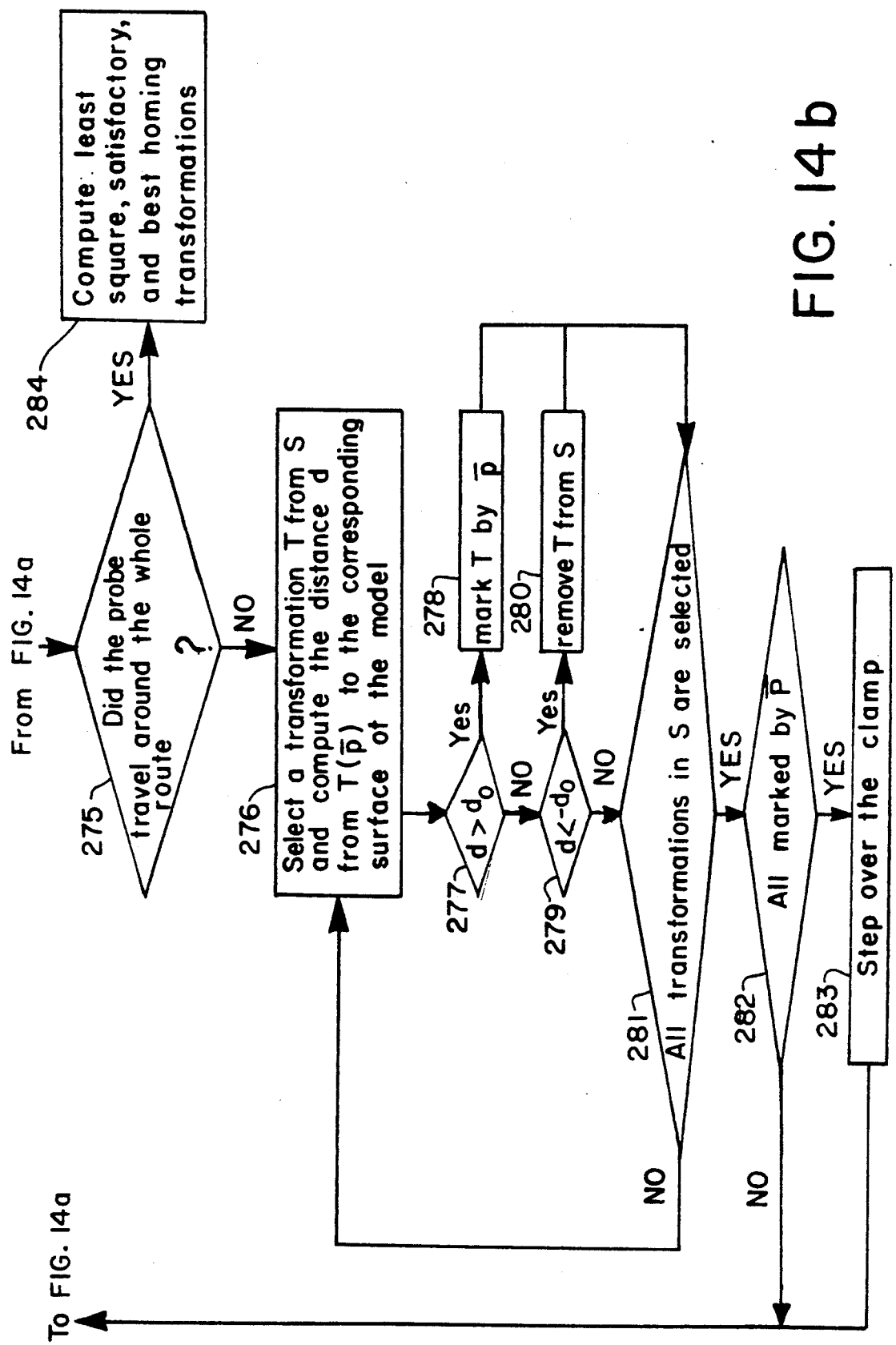

METHOD AND APPARATUS FOR DETERMINING POSITION AND ORIENTATION OF MECHANICAL OBJECTS

FIELD OF THE INVENTION

The present invention relates to an advanced automatic gauging system and method for determining an accurate position and orientation of a workpiece which is placed on a machine table of the system. Various applications of the system and method of this invention include precise machining of approximately or randomly fixtured workpieces, quality control procedures, and incorporation of unknown mechanical objects into CAD/CAM databases.

BACKGROUND OF THE INVENTION

The recent emphasis in the development of manufacturing technology has been directed toward the development of automated systems that eliminate most of the human interaction. Such manufacturing environments employ computer-controlled machine tools that are driven by computer programs, which define the tool motion, also referred to as tool-paths. Typically, a Computer Aided Design (CAD) workstation generates the tool paths automatically by processing the description of a mechanical component created by a designer. Although this environment provides a relatively high degree of automation for manufacturing of simple components that do not require high precision machining, human intervention is required for precision machining of relatively complicated shapes. The areas that still require significant and expensive human input include quality control procedures and fixturing methods.

Prior art CAD stations generate the tool paths that are valid only if a workpiece, which has to be machined into a mechanical component, is fixtured at a predetermined location of a machine table. Therefore, if a workpiece has to be moved from one machine to another at a particular stage of manufacturing, or if it has to be machined at different orientations, a human operator or a robot is required to refixture the workpiece accurately, which is a very difficult, time-consuming, and costly operation. However, this refixturing operation would be significantly simplified if the precise position and orientation of an approximately or randomly fixtured workpiece could be determined automatically or semi-automatically, since, on the basis of this information, the tool paths could be adjusted for accurate machining using conventional geometrical transformations. To date, accurate and efficient methods of localizing randomly and approximately fixtured workpieces have not been developed.

Also, precise fixturing plays an important role in automated quality control procedures. It is impossible to ascertain whether a mechanical component has been manufactured properly unless the relative location of the component is accurately determined with respect to the coordinate system of the model that defines the desired dimensions, which are typically stored in the CAD workstation.

Some progress has been made toward the development of an inspection system that determines whether a mechanical component is within tolerance. U.S. Pat. No. 4,754,417, issued to Beeson, discloses an inspection system which measures tolerance by comparing the coordinate data measured by manually moving a probe to certain features (the only disclosed features are holes) of a mechanical component, and the desired dimensions entered into a data processing system by a user. This disclosure is limited to the mechanical components which can be defined as two-dimensional objects. Furthermore, the inspection procedure discussed in this disclosure is possible only when a finished component is available. Thus, this system cannot be utilized for in-process inspection in order to detect and correct defects at the intermediate stages of manufacture. In addition, this system can only provide a user with a binary, "GO/NO GO", decision that indicates whether a given component is within tolerance. No disclosure is made for determining accurate position and orientation of the component. An inspection system disclosed in U.S. Pat. No. 4,296,474 issued to Hurt also does not handle three-dimensional features, it does not allow for in-process inspection, and it does not generate accurate positioning data.

SUMMARY OF THE INVENTION

Accordingly it is an object of this invention to provide a capability of localizing an arbitrarily or approximately fixtured workpiece.

Another object of the present invention is to provide means for machining largely misaligned or arbitrarily aligned mechanical components correctly and accurately in order to relieve workers or robots from performing time-consuming fixturing operations and to provide the flexibility of developing a process plan with refixturing.

Yet another object of the present invention is to provide information for quality control and in-process inspection of arbitrarily or approximately fixtured workpieces.

Still another object of the present invention is to provide automated means for digitizing of an unknown mechanical component for incorporation into CAD/CAM databases.

According to this invention, a machine tool is provided that is equipped with sensors and interfaced to a data processing system, where numerical data corresponding to a model of the workpiece is stored. In the preferred embodiment of the invention, the sensors are touch-sensitive probes. The machine tool determines the accurate position and orientation of the workpiece by (a) measuring the coordinates of the points located on the surfaces of the workpiece; (b) determining an approximate Euclidean transformation which relates the position and orientation of the workpiece to the position and orientation of the model; and (c) improving the transformation such that the sum of squared distances from the points measured on the surfaces of the workpiece to the corresponding surfaces of the model is minimized.

If a workpiece has at least one planar surface, the method of this invention can be significantly simplified. Accordingly, in this case, a user indicates a planar surface on the workpiece, a corresponding surface on the model, and a probing route which should be parallel to the planar surface. Thereafter, the system moves the probe according to the probing route such that the probe periodically contacts the surfaces of the workpiece and measures the coordinates of the surface points, which are then stored in the memory of the system. The system uses the coordinates of initially measured points to determine an approximate transformation. This transformation is then improved on the basis of each subsequently measured point.

A further simplification of the method of this invention is possible for workpieces that can be defined as "two dimensional" objects. In such case, the system determines coordinates of a plurality of points on the boundary of the workpiece and interpolates these points so as to determine geometrical elements of the boundary of the workpiece. Next, the system computes a set of possible transformations on the basis of two of the geometrical elements. Typically this set contains erroneous as well as correct transformations. The system continues to probe boundary points to eliminate erroneous transformations.

To digitize coordinates of a boundary of an unknown mechanical object, the system moves a sensor along a certain direction and changes the direction by a specified angle after the sensor traveled a predetermined distance. If the sensor contacts the boundary of the workpiece, the system measures and stores the coordinates of a boundary point and then reverses the direction of moving the sensor.

To digitize the representation of a "three-dimensional" surface of a workpiece, the system determines the coordinates of a plurality of points located on the surface and computes the geometrical representation of the surface. Thereafter, the system verifies whether each of the points is measured on the desired surface. The system eliminates a point from the set of measured points, which is removed from the computed representation of the surface by the greater distance than any other point in the set, and computes a new representation of the surface on the basis of a set of points. Next, to determine whether the point is measured on the correct surface, the F-test analysis is applied to a ratio of the sum of squared distances from the points in the initial set of points to the initial representation of the surface and the sum of squared distances from the points in the new set to the new representation of the surface.

BRIEF DESCRIPTION OF THE DRAWINGS

These and other objects, features, and advantages of the invention are described in the following detailed description of a preferred embodiment in which:

FIGS. 14(a) and 14(b) form a flowchart illustrating the steps of determining the position and orientation of a workpiece, which is a "two-dimensional" object;

DETAILED DESCRIPTION OF THE PREFERRED EMBODIMENT

Figure 1:
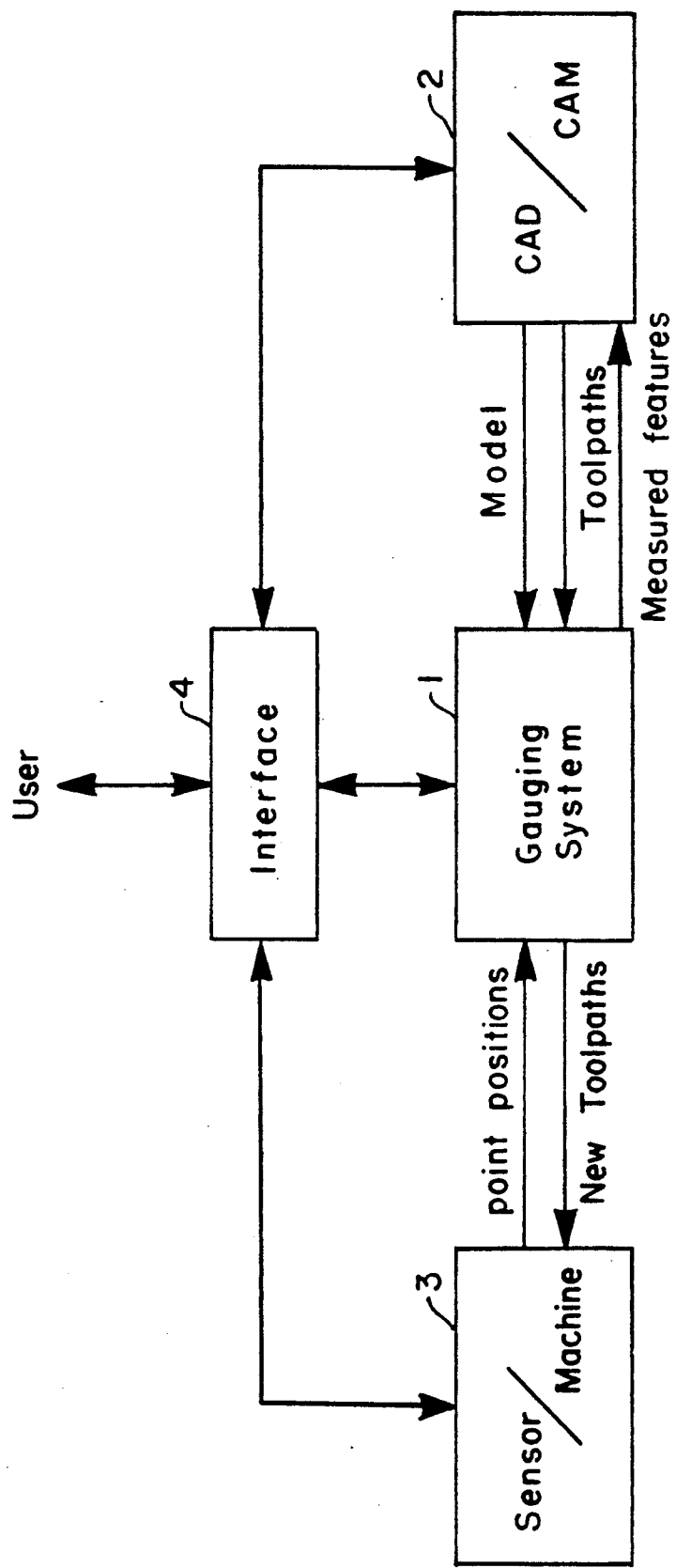
FIG. 1 illustrates functional components and interfaces of the system of this invention.

This discussion proceeds as follows. In section 1, the major functional components of the system of this invention are described. Also, this section provides a discussion of a high level user interface which enables a user to select a desired technique for determining position and orientation of the workpiece on the basis of the geometric properties of a particular workpiece.

Section 2 discloses steps employed in determining position and orientation of workpieces which do not possess special geometric properties. Some of these steps are discussed in greater detail in subsections 2.1–2.4. In particular, subsection 2.1 discloses the steps of determining a least square homing transformation, which relocates coordinates of points measured on the workpiece so as to minimize the sum of squared distances from the points measured on the workpiece to the corresponding model surfaces. Section 2.2 describes the reliability analysis of the obtained transformation. Section 2.3 describes the steps of adjusting the transformation so as to obtain a satisfactory homing transformation which relocates coordinates of points measured on the workpiece to locations that are within tolerance zones specified in the model. Subsection 2.4 describes the steps of improving the satisfactory homing transformation so as to obtain a best homing transformation that transforms the points measured on the workpiece such that the tolerances are more stringent than specified by the model. Finally, subsection 2.5 describes a technique for probing the points on the surfaces of a "three-dimensional" workpiece automatically in order to determine the reliable least square homing transformation.

Section 3 describes simplified techniques for probing boundary points and determining position and orientation of workpieces which have special geometric properties. It should be noted that, although the reliability analysis and techniques for determining least square homing transformation, satisfactory homing transformation, and best homing transformation are described in section 2, these techniques are also applicable to the techniques of section 3. In section 3, subsection 3.1 describes a mesh routing technique for automatic probing of coordinates of points on a boundary of a workpiece which is formed by intersecting the workpiece by a plane which is parallel to the machine table. Subsection 3.2 describes a technique for determining the position and orientation of an essentially "two-dimensional" workpiece which has boundaries consisting of linear and circular segments. Subsection 3.3 describes a technique for determining position and orientation of a workpiece which has at least one planar surface.

Section 4 describes the applications of the method and system of this invention to machining of identical workpieces. Finally, section 5 describes the steps employed in utilizing the system of this invention for digitizing surfaces of "three-dimensional" workpieces.

1. FUNCTIONAL COMPONENTS AND HIGH LEVEL USER INTERFACE

FIG. 1 depicts a generalized block diagram of the system of this invention. As shown, the system comprises a gauging system 1, a CAD/CAM system 2, a sensor/machine system 3, and an interface 4. The gauging system 1 is a computer system such as a Sun workstation comprising a processor, a memory and appropriate input/output devices. Using computer programs to be described below, the computer system computes the transformation that transforms the position and orientation of a workpiece to the position and orientation of its numerical representation (model) stored in CAD/CAM (Computer Aided Design/Computer Aided Manufacturing) system 2. The CAD/CAM system 2 is a relatively conventional CAD/CAM workstation that provides a capability of generating and displaying numerical and graphical representation of the surface elements of the workpiece and a capability of generating the tool paths that define the motion of the tools during manufacture. The CAD/CAM System 2 may also store data that describes surfaces of the stock, or surfaces of the workpiece produced at an intermediate stage of manufacturing or other relevant information that may become useful in a specific embodiment of the invention.

The sensor/machine system 3 comprises computer numerical control machine tools that perform manufacturing operations and position sensors that measure the coordinates of points located on the surfaces of a workpiece. In this embodiment of the invention, the sensors are probes that generate coordinate information when the stylus of a probe comes in physical contact with a surface of a workpiece which is usually clamped on a machine table of system 3. The positioning data measured by the probes is transmitted to the Gauging System 1 that determines the location of the workpiece by matching the coordinates of the points that are measured on the workpiece to the model surfaces stored in the CAD/CAM system 2. Since the stylus of the probes employed in this embodiment of the invention has a finite physical size, in order to perform a proper comparison, the dimensions of the model are enlarged by the size of the stylus.

A user interacts with the gauging system 1, the CAD/CAM system 2, and the sensor/machine system 3 using the interface 4. The interface 4 provides a user with a capability of displaying a model stored in the CAD/CAM system 2, entering data which is requested by the system at a given stage of manufacture and interactively selecting displayed features. It provides a further capability of controlling the position sensors interactively, so that a user can probe a desired point located on a surface of the workpiece, which is clamped on the machine table of the system 3. A standard peripheral device, such as a joystick, can be employed to control the motion of the probes.

At any stage of manufacture, the surfaces of a workpiece can be classified as follows:

1) standard surfaces, i.e. surfaces that are completely machined according to the specifications of the finished product. These surfaces are always probed to determine the position and orientation of a workpiece;

2) envelope surfaces, i.e. unfinished surfaces that encircle the surfaces of the finished product. These are either surfaces of the stock or surfaces of a workpiece produced at an intermediate stage of manufacturer.

The data that describes standard surfaces is always stored in the CAD/CAM system 2 because standard surfaces define the final product as designed. The CAD/CAM system 2 may also store information that defines the envelope surfaces, or a user may specify this information interactively at a specific step of the manufacturing process. In addition, the CAD/CAM systems 2 stores the tool paths that define the motion of the tools of the sensor/machine system 3 during the manufacturing process.

According to this invention, the surface points that define the position and orientation of the workpiece can be measured either interactively (by a user controlling the probes via the interface 4) or automatically (under the direct control of the gauging system 1). After the coordinates of a sufficient number of points located on the surfaces of a workpiece are measured, the gauging system 1 computes the Euclidean transformation that matches the location of the workpiece to the location of the model. Using this transformation, the Gauging system modifies the toolpaths for proper machining of the workpiece by applying the transformation to data that defines the toolpaths. Also, the computed transformation is useful for quality control procedures, and for a variety of other applications discussed below.

Figure 2:
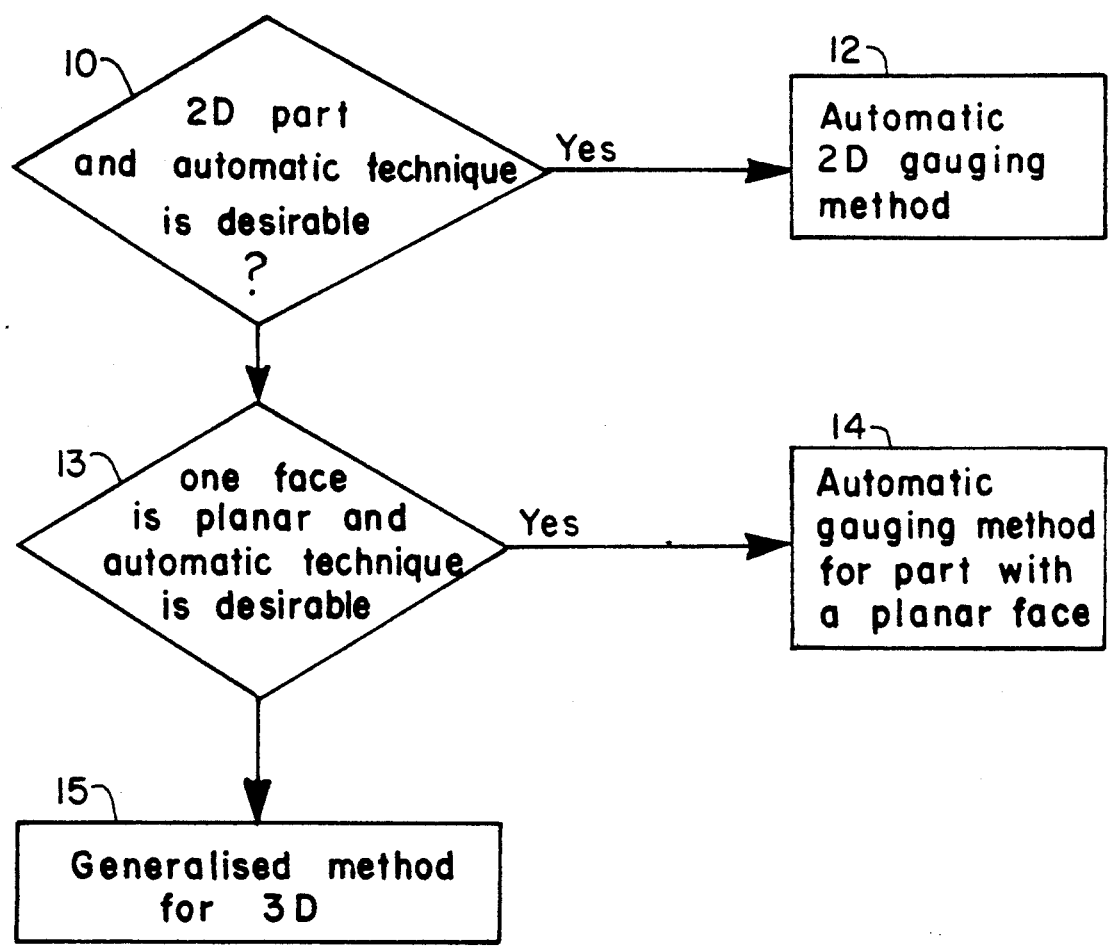
FIG. 2 is a flowchart illustrating a high level user interface of this invention.

FIG. 2 illustrates a high level interface that helps a user to select an appropriate technique of the method of this invention in order to increase the efficiency of probing by taking advantage of the geometric properties of a particular workpiece. If a workpiece can be described as a two-dimensional object (test 10), a user has an option of selecting a fully automated technique (block 12). Otherwise, if one standard surface of a workpiece is parallel to the machine table or there is at least one planar standard surface of the workpiece (test 13), a different automatic technique which, however, requires certain human interaction, can be employed (block 14). If a given workpiece does not possess special geometric features that would permit employing one of the simplified techniques of the method of this invention, a generalized semi-automated technique, applicable to workpieces of arbitrary shapes, is employed (block 15).

2. METHOD AND SYSTEM FOR DETERMINING POSITION AND ORIENTATION OF A "THREE-DIMENSIONAL" WORKPIECE

Figure 3A:
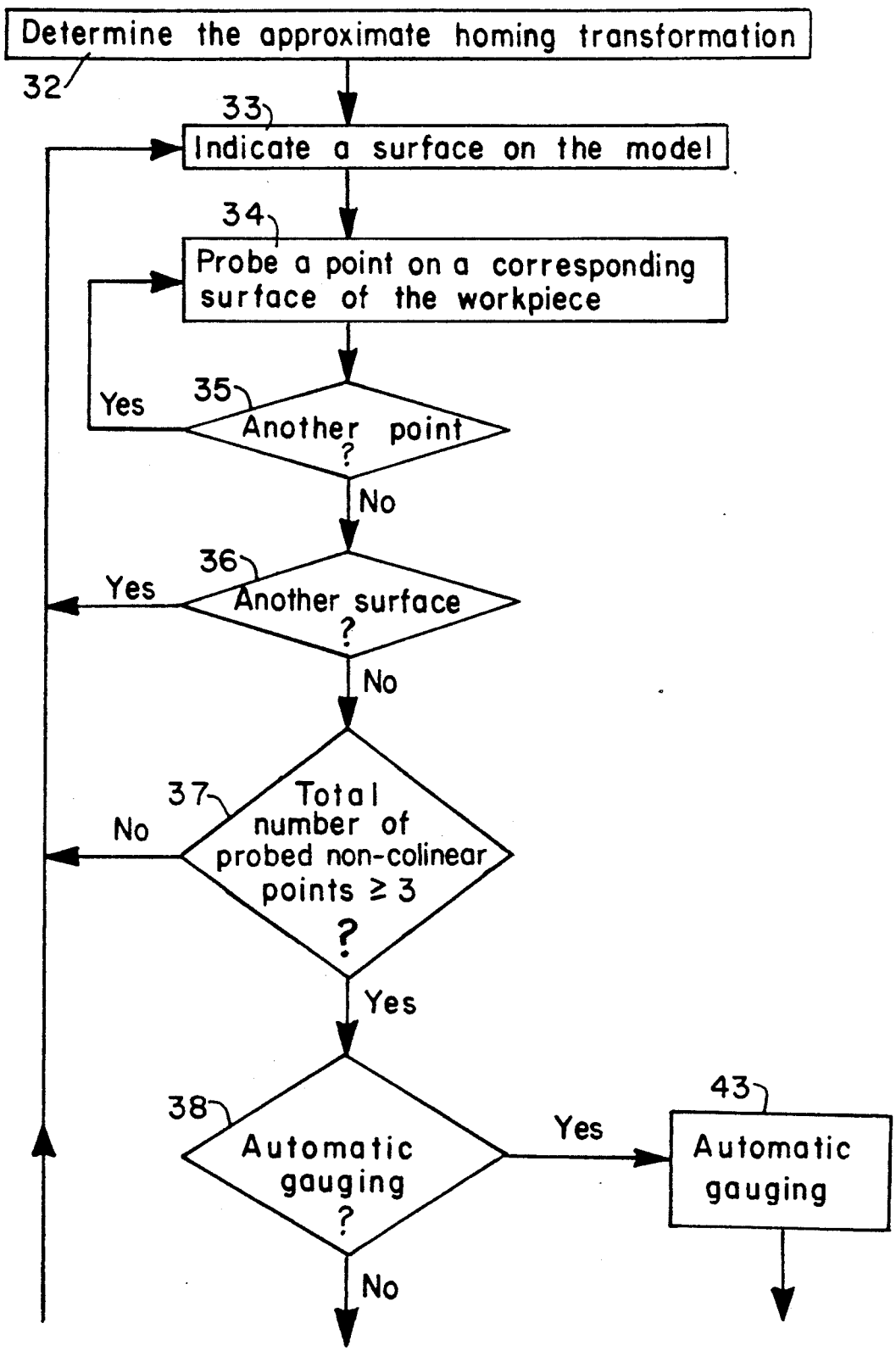
FIGS. 3(a) and 3(b) form a flowchart illustrating the method of determining the position and orientation of the workpiece.

FIGS. 3(a) and (b) illustrate a flowchart that describes the steps of a technique for determining the position and orientation of a workpiece. The process starts at block 32 where a user displays a graphical representation of the model of the workpiece on a screen of the interface 4. Also, at this step, a user clamps a workpiece to the machine table of the system 3, and then interactively changes the orientation of the model such that each virtual surface represented by the model (surface of the model) has approximately the same orientation as a corresponding surface of the workpiece. The interface 4 provides a user with a capability of changing the orientation of the model interactively. Such rotational transformations are generally available in commercial CAD/CAM systems. Alternatively, first, a user may rotate the model to an orientation convenient for machining and then clamp the workpiece accordingly. The permitted discrepancy between the orientation of the edges of the workpiece and the corresponding lines of the model can be approximately 15°. However, if a 3-axis milling machine is utilized as a machine tool, a higher degree of accuracy in the direction that corresponds to Z axis of the machine tool might be necessary. Next, a user indicates a reference point, which is usually a corner or a center of an edge or a face of the workpiece, by interactively identifying this point on the model, for example, by using a mouse, and then moving the probe to touch the corresponding point on the workpiece, for example, by using a joystick.

The above steps provide an approximate homing transformation that correlates the position and orientation of the workpiece to the position and orientation of the model. The rotational component of this transformation is established by positioning the workpiece and the model at similar orientations and the specified reference point provides the translational component. However, this transformation is insufficient for precision machining of the workpiece.

In another embodiment of the invention, the approximate location of the workpiece can be determined by measuring several characteristic points or features of the workpiece clamped on the machine table and then displaying these points or features on the same screen where the model is displayed. Then, a user can change the orientation of the model, which is displayed on the screen, so that its position and orientation approximately matches the position and orientation of the measured points or features. It should be noted that there is a variety of alternative methods for determining the approximate transformation. For example, a user may indicate three reference points on the model and then measure the corresponding points on the workpiece.

To derive an accurate transformation, coordinates of the points located on the surfaces of the workpiece are measured. The accurate transformation is determined by computing the least square, satisfactory, and best homing transformations. The method of this invention provides both automatic and interactive options for measuring the coordinates of the points on the surfaces of the workpiece. Also, there is an option of probing certain points interactively and then directing the system to collect the remaining data automatically. Typically, interactive probing is advisable if a surface contains irregularities, such as holes, or there is a clamp located on the surface, or probing may cause a collision between a spindle of the machine and the workpiece or a clamp that holds the workpiece. In this embodiment of the invention, three points, which are not located on the same straight line (non-collinear), are always probed interactively. There points can be located on the same or different surfaces of the workpiece. Thereafter, an option to select automatic probing is provided, as indicated in test 38.

Figure 4:
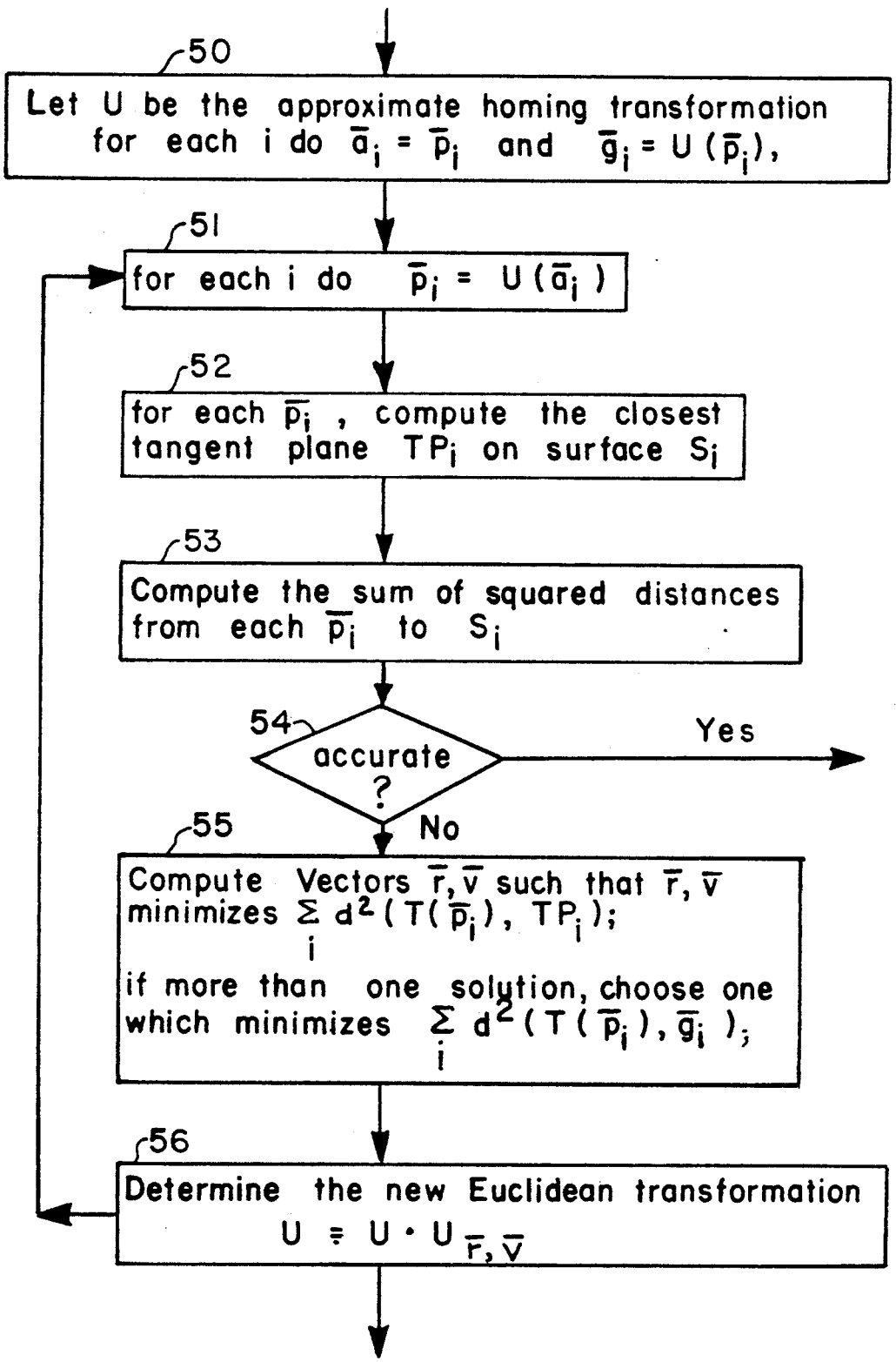
FIG. 4 is a flowchart illustrating the steps of determining the least square homing transformation.

During interactive probing, a user indicates the surface of the model that he is planning to probe (block 33) and then uses a peripheral device of the interface to move the probe to a point on the designated surface (block 34). At test 35, the system requests a user to indicate whether he wants to probe another point on the specified surface interactively, and, if so, the control is transferred to block 34. If, at test 35, a user indicates that he has completed probing points on a specified surface, the system requests a user to indicate whether he wants to probe another surface interactively (block 36), and, if so, the control is transferred back to block 33. Otherwise, control passes to test 37, where the system checks if the total number of probed non-collinear points is greater than two in order to assure that the least square homing technique described subsequently, provides a unique solution. If at least three non-collinear points have not been collected, the system requests a user to probe additional points and, therefore, the control passes back to block 33. Otherwise, if at least three non-colinear points have been probed, system flow is transferred to test 38, where a user is provided with an option to switch to automatic gauging. If, at this point, the automatic option is not selected, control passes to block 39, where the least square homing transformation, which is an accurate transformation described in conjunction with FIG. 4, is computed. Thereafter, at block 40, a reliability analysis, discussed in conjunction with FIGS. 7(a)–(d), is performed. If the reliability analysis shows that the homing transformation determined at the previous step is not reliable (block 41), the control passes back to block 33, where a user is requested to collect coordinates of the additional surface points. If the transformation determined in block 40 is reliable, flow passes from block 41 to block 42, where the satisfactory homing transformation and the best homing transformation, discussed subsequently, are computed. If, at block 38, a user selected an automatic gauging option, control is transferred to block 43, where the system collects coordinates of the surface points automatically until a reliable least square homing transformation is determined. Thereafter, control passes from block 43 to block 42 for computing the satisfactory and best homing transformations.

After the best homing transformation U has been determined at block 42, the misalignment of the z-direction of the workpiece with respect to z-axis of the model can be easily computed using known methods; see *Analytic Geometry, with an Introduction to Vectors and Matrices*, by D. C. Murdoch, chapter 9 (John Wiley & Sons, 1966). As mentioned previously, if z-direction alignment is not sufficiently accurate, precise machining using a 3-axis machine is not feasible. In this case, a user has to reclamp the workpiece, so that the z-direction of the workpiece is closer to the z-direction of the model and the procedure of FIG. 3 is repeated. However, if the machine tool of a particular embodiment of the invention is capable of adjusting the z-direction of a workpiece clamped on the machine table, the system would control the machine to adjust the z-direction. For example, this automatic operation is feasible if the machine tool is a 5-axis milling machine. More specifically, a 5-axis machine would rotate the machine table about the z-axis so that the z-direction is parallel to the xz plane, and then rotate the machine table about the y-axis so that the z-direction is parallel to the z-axis of the machine coordinate system. This operation can be expressed by a Euclidean transformation ($U_1$) as described in a variety of books on geometry. For example, *Analytic Geometry, with an Introduction to Vectors and Matrices*, by D. C. Murdoch, chapter 9 (John Wiley & Sons, 1966). In this case, the toolpaths are modified by the transformation $U^{-1}U_1$, which is a product of the inverse of the best homing transformation obtained in block 42 and the transformation employed in adjusting the z-direction of the machine.

2.1. METHOD AND SYSTEM FOR DETERMINING LEAST SQUARE HOMING TRANSFORMATION

Referring now to FIG. 4, there is shown a more detailed flowchart of the technique for determining the least square homing transformation, which relocates the coordinates of the workpiece to fit with the coordinates of the model, so as to minimize the sum of squared distances from the points measured on the standard surfaces of the workpiece to the corresponding model surfaces. Hereinafter, this technique (and variations thereof) is referred to as "least square homing" technique. As indicated previously, this technique is applied after the coordinates of a plurality of points located on the surfaces of the workpiece have been measured. It should be noted that, in this embodiment of the invention, the least square homing technique is applied to the points measured on the standard surfaces.

The least square homing technique is an iterative method that computes a series of Euclidean transformations which progressively decrease the sum of the squared distances from the points probed on the surfaces of the workpiece to the corresponding surfaces of the model. Hereinafter, a surface S of the model that corresponds to the surface of the workpiece, where a point $\bar{p}$ was measured, is a "home" surface of the point $\bar{p}$. Let $\bar{p}_i$ = 1,2, ... n denote the points measured on the workpiece, $U(\bar{p}_i)$ denote the position of a point $\bar{p}_i$ after transformation U has been applied to this point, and let $d(U(\bar{p}_i), S_i)$ represent the distance from the point $U(\bar{p}_i)$ to the surface $S_i$, which is the surface of the model that corresponds to the surface of the workpiece where $\bar{p}_i$ has been measured (i.e. $S_i$ is a home surface of $\bar{p}_i$). More specifically, the least square homing technique determines a Euclidean transformation U such that the value of the following expression is minimized:

$$\sum_i [d(U(\bar{p}_i), S_i)]^2$$

The process depicted in FIG. 4 starts at block 50 where an approximate transformation is assigned to the variable U, the measured coordinates are saved as $\bar{a}_i = \bar{p}_i$, and the transformed coordinates as $\bar{g}_i = U(\bar{p}_i)$. Next, at block 51, the transformation U is applied to the coordinates of each measured point $\bar{p}_i$ stored as $\bar{a}_i$ and the new values of each $\bar{p}_i$ are obtained. Flow then passes to block 52, where, for each point $\bar{p}_i$, the system determines a point $\bar{q}_i$ located on the corresponding home surface $S_i$ of $p_i$ such that the distance between $\bar{q}_i$ and $\bar{p}_i$ is less than the distance between $\bar{p}_i$ and any other point on $S_i$. The system then determines the plane $TP_i$ which is tangent to $S_i$ at point $\bar{q}_i$. (Hereinafter $\bar{n}_i$ denotes the unit normal vector of the tangent plane $TP_i$ to a surface $S_i$ at point $\bar{q}_i$). It should be noted that this closest tangent plane of a surface is easily determined using known computational methods. If the surface is a sphere, a cylinder, a plane, or a cone, the closest tangent plane can be determined using well known geometrical methods. If the surface is a smooth surface having a more complicated shape, the minimization method described in various books on calculus or operations research can be used. For example, see *Mathematics for Operations Research* by W. H. Marlow, chapter 7 (John Wiley & Sons, 1978); and *Nonlinear Programming: Analysis and Methods* by M. Avriel (Prentice-Hall, 1976).

Flow then passes to block 53 which computes the sum of squared distances from each transferred point, which was measured on a standard surface of a workpiece, to the corresponding home surface on the model as defined above. At test 54, the process terminates if (1) this is not the first iteration of the loop (blocks 51-56), and (2) the difference between the result obtained in block 53 during the previous iteration and the result obtained at block 53 during the current iteration is less than a predetermined value. When the least square homing transformation is determined, a computed location of the workpiece can be determined by applying the inverse least square homing transformation to numerical data corresponding to the model.

Otherwise flow passes to block 55, where the "tangent transformation" T that minimizes the sum of squared distances between each transformed point $T(\bar{p}_i)$ and the corresponding tangent plane is determined. The "tangent transformation" $T_{r,v}$ consists of a "tangent rotation," which is denoted by vector $\bar{r} = (u,v,w)$ that passes through (0,0,0) of the coordinate system, and a translation, which is denoted by vector $\bar{v} = (x,y,z)$. The tangent rotation is different from a Euclidean rotation and, therefore, the tangent transformation is not a Euclidian transformation. A Euclidean rotation "moves" a point $\bar{p}$ along a circle C with a center at the axis of rotation, whereas the tangent rotation moves a point $\bar{p}$ along the tangent line to a circle C passing through $\bar{p}$, as though drops of water move off a rim of a rotating umbrella. More specifically, the tangent transformation transforms a point $\bar{p}$ to a new position $\bar{p} + \bar{r} \times \bar{p} + \bar{v}$. Hereinafter, $T_{r,v}$ denotes a tangent transformation and $U_{r,v}$ denotes a Euclidean transformation. The Euclidean transformation $U_{r,v}$ includes a Euclidean rotation of radian $|\bar{r}|$ about the vector r and a translation by vector $\bar{v}$. Although Euclidean and tangent transformations are different, both transformations produce similar results for small values of $\bar{r}$. The Euclidean rotation and translation can be found in a variety of books on geometry, such as *Computer Graphics* by D. F. Rogers et al., chapter 3 (McGraw-Hill, Inc. 1976), *Analytic Geometry with an Introduction to Vectors and Matrices* by D. C. Murdoch, chapters 4 and 9 (John Wiley & Sons, 1966). The vector product $\bar{r} \times \bar{p}$ can be found in *Differential and Integral Calculus*, by R. Courant, p.14 (Interscience publishers, 1936).

After the tangent transformation $T_{r,v}$ has been applied to each point $\bar{p}_i$, the sum of squared distances from each transferred point $T(\bar{p}_i)$ to the corresponding tangent planes is expressed in terms of not transformed values of $\bar{p}_i$ as follows:

$$E = \sum_i [(p_i + r \times p_i + v - q_i) \cdot n_i]^2$$

Where . is the inner product described in various books on geometry and linear algebra, such as *Elementary Linear Algebra* by B. Kolman, chapter 3 (Macmillin Publishing Co., 1982).

The best tangent transformation $T_{r,v}$ that minimizes E is determined as follows. Let us donate the derivatives of E for the variables u,v,w,x,y,z by $E_u, E_v, E_w, E_x, E_y, E_z$, which are linear functions of u,v,w,x,y,z. In order to minimize E, the following system of six linear equations with six unknowns, $\bar{r} = (u,v,w)$ and $\bar{v} = (x,y,z)$, is solved.

$$E_u = 2 \sum_i [(p_i + r \times p_i + v - q_i) \cdot n_i](p_{iy}n_{iz} - p_{iz}n_{iy}) = 0$$
$$E_v = 2 \sum_i [(p_i + r \times p_i + v - q_i) \cdot n_i](p_{iz}n_{ix} - p_{ix}n_{iz}) = 0$$
$$E_w = 2 \sum_i [(p_i + r \times p_i + v - q_i) \cdot n_i](p_{ix}n_{iy} - p_{iy}n_{ix}) = 0 \quad (A)$$
$$E_x = 2 \sum_i [(p_i + r \times p_i + v - q_1) \cdot n_i]n_{ix} = 0$$
$$E_y = 2 \sum_i [(p_i + r \cdot p_i + v - q_1) \cdot n_i] n_{iy} = 0$$
$$E_z = 2 \sum_i [(p_i + r \cdot p_i + v - q_1) \cdot n_i]n_{iz} = 0$$

where $$\bar{n}_i = (n_{ix}, y_{iy}, z_{iz})$$
$$\bar{p}_i = (p_{ix}, p_{iy}, p_{iz})$$
$$\bar{q}_i = (q_{ix}, q_{iy}, q_{iz})$$

The solutions of the above system of equations provides rotational and translational transformation vectors $\bar{r}=(u,v,w)$ and $\bar{v}=(x,y,z)$ of the tangent transformation. These vectors also define a Euclidean transformation $U_{r,v}$. (In a two dimensional case, $u=v=z=0$ and, therefore, the system of equations $E_w=E_x=E_y=0$ is solved to determind w,x,y).

Next, at block 56, a new Euclidean transformation U is obtained by multiplying the previous value of the transformation U by the transformation $U_{r,v}$, in which vectors $\bar{r}$ and $\bar{v}$ are determined at block 55. Initially, the value of U is the approximate homing transformation determined at block 50. In the subsequent iterations, the value of U is the value determined in block 56 during the previous iteration. Thereafter, flow returns to block 51, where the Euclidean transformations U is applied to each point $\bar{a}_i$. This iterative process continues until the desired accuracy of the transformation is achieved (test 54). If the initial transformation determined in block 50 is sufficiently accurate, the least square homing technique practically always converges to an improved transformation which has the desired accuracy specified in block 54.

In the alternative embodiment, at block 55, the least square homing transformation can be determined by first translating the coordinates of the measured points so as to minimize the sum of squared distances from the points to the corresponding home surfaces, and then, applying the tangent rotation about the center of gravity of the translated points to minimize the sum of squared distances further. This method requires solving two linear systems of equations with three unknowns, instead of one system with six unknowns.

In another embodiment, at block 55, the sum of squared distances can be minimized by first performing a translation that minimizes the sum of squared distances along the x-axis, then performing similar translations along y-axis and z-axis and, finally, minimizing the sum of squared distances by rotating each point about the lines passing through the center of gravity of the translated points and parallel to x, y, and z axes. This technique requires a computation of six equations, each of which with one unknown, namely, one equation for each translation and one equation for each rotation.

The system of equations (A), defined in conjunction with block 55, has a unique solution only if the determinant of the system is not zero, otherwise, there are infinitely many solutions and, as a result, the unique position and orientation of a workpiece cannot be determined. This problem may arise in one of the following two cases.

The first situation occurs when the total number of measured surface points is insufficient to determine the unique position and orientation of the workpiece, however, additional measurements would supply sufficient data to determine the transformation uniquely. The second situation arises when the standard surfaces that are machined on a workpiece at a particular stage of manufacture do not uniquely define the position and orientation of the workpiece. For example, it is impossible to determine the position of the workpiece by two parallel planar surfaces regardless of the number of measured surface points, because the workpiece can "slide" along these surfaces. Hence, there may be a plurality of possible positions of the workpiece even if the orientation of the parallel planar surfaces are correctly defined.

Figure 5:
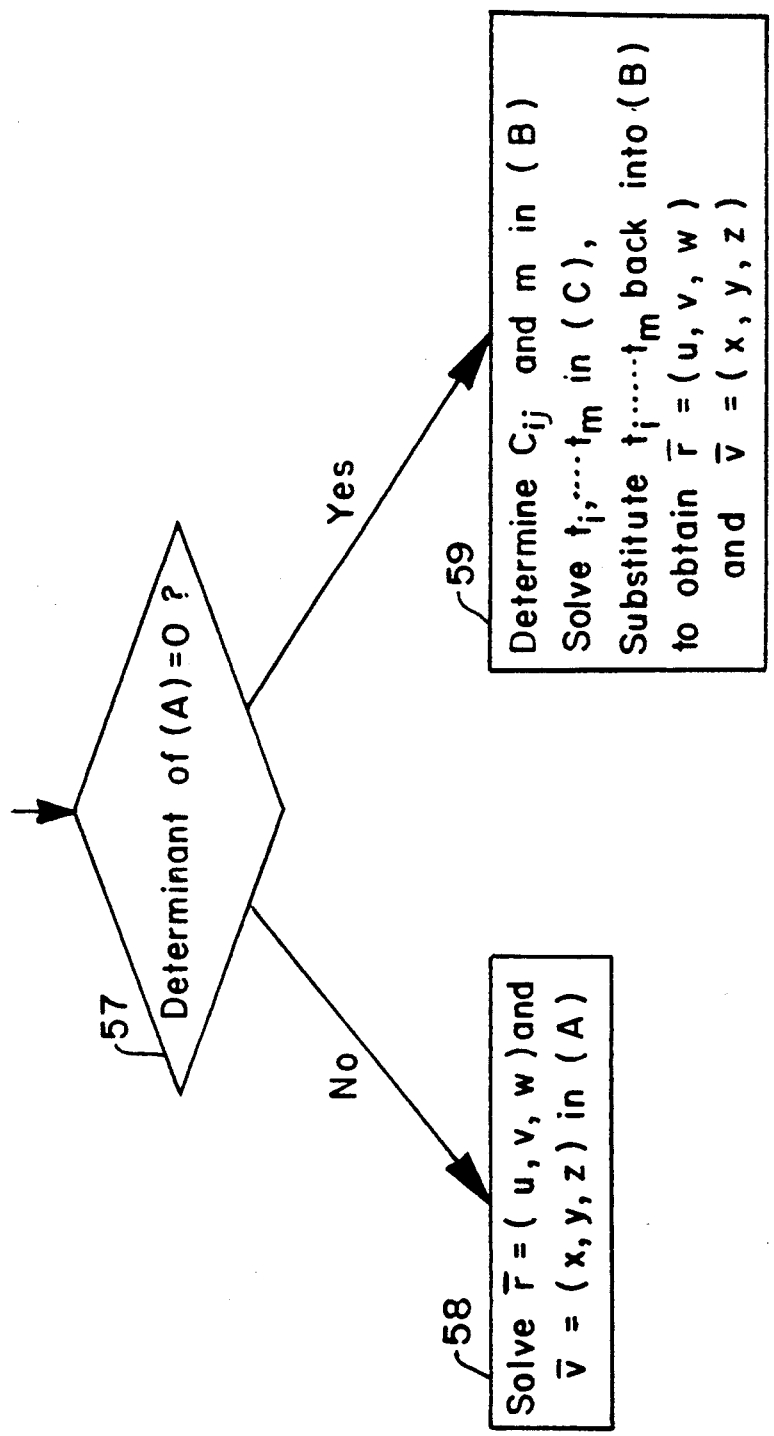
FIG. 5 is a flowchart illustrating the further steps of determining the least square homing transformation.

FIG. 5 depicts an extension of the method described in conjunction with block 55 in FIG. 4, which provides the "closest" solution for $\bar{r}$ and $\bar{v}$ in both situations described above. As indicated in FIG. 5, if the determinant of the system of equations (A) is non-zero (test 57), the control passes to block 58 where vectors $\bar{r}$ and $\bar{v}$ are uniquely determined as discussed previously. Otherwise (the determinant of (A) is Zero), the control passes to block 59 where the closest solutions for $\bar{r}$ and $\bar{v}$ are determined using the following method.

At block 59, the transformation $U_1$, which is the closest transformation to the approximate homing transformation U, is selected such that $$\sum_i d^2(U_1(p_i), U(p_i)) = \sum_i d^2(U_1(p_i), g_i)$$

is minimized.

As indicated at blocks 55 and 59, the system selects the tangent transformation $T_{r,v}$ from the set of possible tangent transformations T that minimize the sum of squared distances from each transferred point $T(\bar{p}_i)$ to the closest tangent plane $TP_i$, which is the closest to U. This is accomplished by solving the system of equations (A), provided above, using the Gausian elimination algorithm (see *Elementary Linear Algebra* by Howard Anton, chapter 1, (John Wiley & Sons, Inc. 1973)) and expressing the solutions parametrically as a system of equations (B), with m parameters $t_1, \ldots, t_m$, shown below $$u = c_{10} + c_{11}t_1 + \ldots + c_{1m}t_m$$
$$v = c_{20} + c_{21}t_1 + \ldots + c_{2m}t_m$$
$$w = c_{30} + c_{31}t_1 + \ldots + c_{3m}t_m \quad (B)$$
$$x = c_{40} + c_{41}t_1 + \ldots + c_{4m}t_m$$
$$y = c_{50} + c_{51}t_1 + \ldots + c_{5m}t_m$$
$$z = c_{60} + c_{61}t_1 + \ldots + c_{6m}t_m$$

The constants $c_{ij}$ are obtained using the Gausian elimination algorithm. The parameters $t_1, \ldots, t_m$ are selected such that the sum of squared distances from each transferred pint $T(\bar{p}_i)$ to $\bar{g}_i = U(\bar{p}_i)$ is minimized, as described below.

Let us denote the distances along x,y,z axes from each transferred point $\bar{p}_i$ to the point $\bar{g}_i = (g_{ix}, g_{iy}, y_{iz})$ by $D_{ix}, D_{iy}, D_{iz}$. These distances can be expressed as follows:

$$D_{ix} = p_{ix} + vp_{iz} - wp_{iy} + x - g_{ix}$$
$$D_{iy} = p_{iy} + wp_{ix} - up_{iz} + y - g_{iy}$$
$$D_{iz} = p_{iz} + up_{iy} - vp_{ix} + z - g_{iz}$$

Therefore the selected values of $t_1, \ldots, t_m$ should minimize the following expression $$\sum_{i=1}^{n} [D_{ix}^2 + D_{iy}^2 + D_{iz}^2]$$

The value of the above expression is minimized if parameters $t_1, \ldots, t_m$ are selected to satisfy the following equation:

$$\sum_{i=1}^{n} [D_{ix}(p_{ix}c_{2j} - p_{iy}c_{3j} + c_{4j}) + D_{iy}(p_{ix}c_{3j} - p_{iz}c_{ij} + c_{5j}) + \quad (C)$$

$$D_{iz}(p_{iy}c_{1j} - p_{ix}c_{2j} + c_{6j})] = 0$$

$j = 1, \ldots, m$

As defined above $D_{ix}$, $D_{iy}$, $D_{iz}$ are linear expressions of $u,v,w,x,y,z$ in which each of $u,v,w,x,y,z$ is a linear expression of $t_1, \ldots, t_m$. Therefore, the combination of equations (B) and (C) is a linear system of m equations and m unknowns $t_1, \ldots, t_m$. Solving the system of equations for $t_1, \ldots, t_m$ and substituting the obtained values of $t_1, \ldots, t_m$ into the system of equations (B), the transformation vectors $\bar{r}=(u,v,w)$ and $\bar{v}=(vx,y,z)$ are determined.

2.2 RELIABILITY ANALYSIS

As indicated, the least square homing technique discussed in conjunction with FIGS. 4 and 5 provides a way of determining the transformation that defines accurate position and orientation of the workpiece with respect to the coordinate system of the model. Under this transformation, each measured point $\bar{p}_i$ is accurately transformed to a corresponding home surface of the model. However, since there is a finite error associated with each measured point, the result might still be inadequate. Therefore, as indicated in block 40, FIG. 3, the reliability of the transformation has to be verified. The technique of block 40 is described in detail below.

Figure 6:
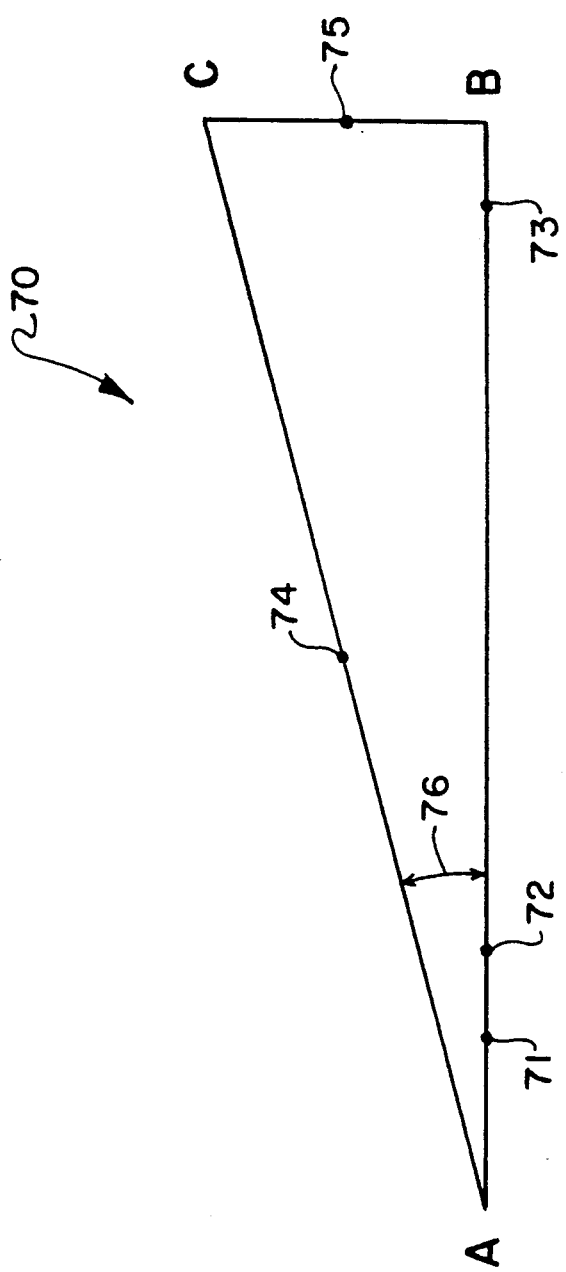
FIG. 6 is an example that illustrates the issue of reliability of determined position and orientation of an FIGS. 7(a)–(d) are flowcharts illustrating the steps of the reliability analysis.

The issue of reliability will become apparent if we consider the following example. To determine the orientation of the triangle 70, shown in FIG. 6, it is necessary to probe two points on any edge. However, due to the error of probing, which is usually a function of the accuracy of the probe and the quality of the workpiece surfaces, if the points are probed very close to each other, such as points 71 and 72, the orientation of the triangle computed on the basis of these points is not rotationally reliable, because the angular error is proportional to the probing error divided by the distance between the measured points (71 and 72). The rotational reliability of the computed orientation of the triangle 70 would be increased if points 71 and 73 were probed, since there is a greater distance between the points.

Assuming that points 71 and 73 are probed, to determine the position of the triangle, it is necessary to probe another point on a different edge of the triangle. For example, if point 74 is probed, a small probing error associated with point 74 may cause a large error of the computed position of the triangle in the horizontal direction if angle 76 is small, because the error is proportional to the probing error at point 74 divided by the sine of angle 76. In other words, the translational reliability of the computed position of the triangle along the horizontal direction is not sufficiently reliable. In this illustration, if another point 75 were probed, the translational reliability would be increased. If the computed location of the workpiece is not translationally or rotationally reliable, there is a possibility that the computed position and orientation of the workpiece is different from the actual position and orientation, and, thus, the modified tool paths would not produce sufficiently accurate machining. Therefore, the reliability analysis is required.

During the reliability analysis of block 40, the systems assume that the computed location of the workpiece differs from the actual location of the workpiece by a certain error value. The system performs a statistical analysis and determines the bound of such error so that the probability that the error is greater than the bound, is negligible. The probability P(B) that the possible error is greater than a bound B decreases as the value of B increases. It is known from probability theory that, if P(B) is less than a small number $\epsilon$, $P(B) \leq \epsilon$, the probability that the possible error is bounded by B (not larger than B) is not less than $1-\epsilon$, where $1-\epsilon$ is a confidence limit.

Also, it should be noted that the reliability analysis computes the bound of error of the transformation with respect to a specified direction in three-dimensional space. However, according to this invention, the direction can be determined in which the possible error of the transformation is greater than in any other direction. Therefore, the reliability analysis is performed only with respect to this worst case direction.

As indicated, at block 40, the measured points have been already transformed by the least square homing transformation of block 39, so as to minimize the sum of squared distance ($E_o$) from each point $\bar{p}_i$ to the corresponding home surfaces $S_i$. Let us denote the transformed points as $\bar{p}_i=(p_{ix},p_{iy},p_{iz})$, the corresponding closest points on the home surfaces $S_i$ as $\bar{q}_i=(q_{ix},q_{iy},q_{iz})$, and the normal unit vector at point $q_i$ as $\bar{n}_i=(n_{ix},n_{iy},n_{iz})$, $1 \leq i \leq n$. According to this invention, first, the system makes an assumption about the actual position and orientation of the workpiece, i.e., translational distance d along a given direction and the total rotational angle $\alpha$ of the computed location of the workpiece with respect to the assumed actual location of the workpiece. Next, the sum of squared distances E from each point of the assumed actual location to the corresponding home surface is computed This error value E is necessarily greater than $E_o$. Let us assume that $E_o$ is increased by $E_2$ such that the total error $E_o+E_2$. The value of total error increases as a function of d and $\alpha$. Using the F-test in statistics analysis the system computes the upper bound of the value of $F=(E_o+E_2)/E_o$, and then computes the sufficiently accurate upper bound of the values of d and $\alpha$ on the basis of the upper bound of F. The F-test analysis is described in a variety of testbooks on statistics, for example, see *Introduction to Mathematical Statistics* by Paul G. Hoel, pp.150-151 (John Wiley & Sons, Inc., 1947)

To verify reliability, the system performs translational and rotational reliability analysis. The description of the translational reliability analysis is provided first. Subsequently, the rotational reliability is discussed.

To analyze translational reliability, let us express a vector which simulates a translational movement of the assumed actual position of the workpiece with respect to the computed position as $\bar{v}=(x,y,z)$. As indicated, the sum of squared distances of the assumed actual position of the workpiece is $E_2$ greater than the error $E_o$ of the computed position; thus the total error of the assumed actual position is $$E=E_o+E_2$$

$E_o$ and $E_2$ are computed using the following computation steps:

$$\left.\begin{array}{l} f_{1i} = n_{ix} \\ f_{2i} = n_{iy} \\ f_{3i} = n_{iz} \\ f_{4i} = (p_{ix} - q_{ix})n_{ix} + (p_{iy} - q_{iy})n_{iy} + (p_{iz} - q_{iz})n_{iz} \\ \text{for } i = 1,2,\ldots,n. \end{array}\right\} \quad (1)$$

$$c_{ij} = \sum_{k=1}^{n} f_{ik}f_{jk} \text{ for } i,j = 1,2,3. \quad (2)$$

$$E_o = \sum_{i=1}^{n} f_{4i}^2 \quad (3)$$

$$E_2 = (x,y,z)J(x,y,z)' \quad (4)$$

In the above expressions, $(x,y,z)'$ is the transpose matrix of $(x,y,z)$, J is a $3\times 3$ matrix $J=(c_{ij})_{3\times 3}$ (in a two-dimensional case, the third row and the third column of the matrix J are zero and can be removed and, therefore, J is a $2\times 2$ matrix). The F-test technique, as applied in this embodiment of the invention, provides the following bound of the distance d, which is the translational difference between the actual and computed positions, along the direction $\bar{v}=(x,y,z)$:

$$d \leq k_{f,\epsilon}(e_o(x^2+y^2+z^2)/E_2)^{\frac{1}{2}} \quad (5)$$

with probability not less than $1-\epsilon$, where $1-\epsilon$, is the confidence limit and f is the degree of freedom which is $n-6$ for three-dimensional objects and $n-3$ for two-dimensional objects. The constants $k_{f,\epsilon}$ are provided in the following table.

| $\epsilon$ | 0.050 | 0.010 | 0.005 | 0.001 |
|---|---|---|---|---|
| f = 2 | 4.24 | | | |
| f = 3 | 2.87 | — | — | — |
| f = 4 | 2.32 | 3.87 | — | — |
| f = 5 | 2.01 | 3.16 | 4.71 | — |
| f = 6 | 1.81 | 2.73 | 3.17 | 4.36 |
| f = 7 | 1.67 | 2.45 | 2.81 | 3.74 |
| f = 8 | 1.56 | 2.24 | 2.55 | 3.32 |
| f = 9 | 1.48 | 2.09 | 2.35 | 3.02 |
| f = 10 | 1.41 | 1.96 | 2.20 | 2.78 |
| f = 15 | 1.18 | 1.59 | 1.75 | 2.13 |
| f = 20 | 1.06 | 1.39 | 1.52 | 1.81 |
| f = 25 | 0.98 | 1.27 | 1.38 | 1.62 |
| f = 30 | 0.92 | 1.18 | 1.28 | 1.49 |
| f = 35 | 0.87 | 1.11 | 1.20 | 1.39 |
| f = 40 | 0.83 | 1.06 | 1.14 | 1.31 |
| f = 45 | 0.80 | 1.01 | 1.09 | 1.25 |
| f = 50 | 0.77 | 0.97 | 1.05 | 1.20 |
| f = 60 | 0.73 | 0.91 | 0.98 | 1.12 |
| f = 70 | 0.70 | 0.87 | 0.93 | 1.06 |
| f = 80 | 0.67 | 0.83 | 0.89 | 1.01 |
| f = 90 | 0.65 | 0.80 | 0.85 | 0.97 |
| f = 100 | 0.63 | 0.77 | 0.83 | 0.93 |

The values of $K_{f,\epsilon}$ for other values of f can be obtained by interpolating the values provided in the table above. Generally, the value of $K_{f,a}=\sqrt{1-B}$ where the values of B can be found along the diagonal line of the table in *Introduction of Mathematical Statistics* by Paul G. Hoel, p.250 (John Wiley & Sons, Inc., 1942).

To determine the worst case direction in which the error of the transformation is greater than in other directions, the system computes the Eigen values and Eigen vestors of the matrix J of equation (4). The techniques for computing Eigen values and Eigen vectors are described in *Elementary Lienar Algebra* by Howard Anton, chapter 6, pp. 233-252 (John Wiley & Sons, Inc. 1973). If the smallest eigen value of J is $\lambda$, the error along any direction is bounded by $$d \leq k_{f,\epsilon}(E_o/\lambda)^{\frac{1}{2}} \quad (6)$$

The Eigen vector corresponding to the smallest Eigen value is the most unreliable direction.

In computing the rotational reliability, a vector $\bar{r}$ is defined and a rotational movement of the assumed actual position around this vector is simulated. The values of $E_o$ and $E_2$, defined previously, are computed as follows $$\left.\begin{array}{l} f_{1i} = p_{iy}n_{iz} - p_{iz}n_{iy} \\ f_{2i} = p_{iz}n_{ix} - p_{ix}n_{iz} \\ f_{3i} = p_{ix}n_{iy} - p_{iy}n_{ix} \\ f_{4i} = n_{ix} \\ f_{5i} = n_{iy} \\ f_{6i} = n_{iz} \\ f_{7i} = (p_{ix} - q_{ix})n_{ix} + (p_{iy} - q_{iy})n_{iy} + (p_{iz} - q_{iz})n_{iz} \end{array}\right\} \quad (1a)$$

where $i = 1,2,\ldots,n$.

$$c_{ij} = \sum_{k=1}^{n} f_{ik}f_{jk} \text{ for } i,j = 1,\ldots,6. \quad (2a)$$

$$E_o = \sum_{i=1}^{n} f_{7i}^2 \quad (3a)$$

Next, matrix J is defined as $J = (c_{ij})_{6\times 6}$. \quad (4a)

Note that J is a symmetric matrix. At this point, the system eliminates the upper right and lower left portions of the matrix J using a symmetric linear transformation. More specifically, the system performs a row transformation in order to eliminate the upper right portion of J. In other words, the system determines a matrix $$W = \begin{pmatrix} E & A \\ O & B \end{pmatrix}$$

wherein E is a unit matrix, 0 is a zero matrix, A and B are arbitrary matrices selected such that the upper right portion of WJ is eliminated. Since J is symmetric, the upper right and lower left portions of the matrix WJW' are eliminated and this matrix can be represented as follows $$WJW = \begin{pmatrix} RO \\ OC \end{pmatrix}$$

wherein matrix R is necessary for subsequent computations and C is an arbitrary matrix. In other words, the system determines 3×3 matrices E, 0, A, B, C, R such that $$\begin{pmatrix} EA \\ OB \end{pmatrix} J \begin{pmatrix} EA \\ OB \end{pmatrix} = \begin{pmatrix} RO \\ OC \end{pmatrix} \quad (5a)$$

where E is the unit matrix, 0 is the zero matrix, A and B are arbitrary matrices. Therefore, the matrix R is obtained. An elimination method that uses row and column matrix transformations is described in *Elementary Linear Algebra* by Howard Anton, chapter 1 (John Wiley & Sons, Inc. 1973). After the matrix R is determined the value of $E_2$ is computed as follows:

$$E_2 = (u,v,w) R (u,v,w)' \quad (6a)$$

The angular error $\alpha$ about the direction $\bar{r}$ is bounded by the following expression $$\alpha \leq k_{f,\epsilon} (E_o(u^2+v^2+w^2)/E_2)^{\frac{1}{2}} \quad (7a)$$

with probability $1-\alpha$. The bound of the angular error about the worst case direction $\bar{r}$ is determined by computing the smallest Eigen value $\lambda$ of R.

$$\alpha < k_{f,\epsilon} (E_o/\lambda)^{\frac{1}{2}} \quad (8a)$$

If the position and orientation of a workpiece is completely defined by the standard surfaces, the translational reliability and the rotational reliability analysis for all directions is performed by performing the reliability analysis for the worst case directions, in which the error is bounded as defined in expressions (5) and (8a). However, in certain cases, the position and orientation of the workpiece can not be determined by the positions and orientations of standard surfaces only. For example, if the workpiece has only two standard planar surfaces, it can "slide" along a particular direction, and, therefore, the translational reliability along the sliding direction would not be useful.

In such special circumstances, the reliability is analyzed according to the following six categories. As indicated, the translational and rotational reliabilities for a plurality of directions are verified by determining the reliability of the worst case direction.

(1) If the set of standard surfaces consist of concentric spheres, the translational reliability for the worst case of all directions is verified.

(2) If the set of standard surfaces consist of parallel planes, the rotational reliability with respect to the worst case of all directions which are parallel to these planes is verified.

(3) If the set of standard surfaces consists of cylinders with the common rotational axis, the rotational reliability about the worst case of directions that are perpendicular to the rotational axis is verified.

(4) If the set of standard surfaces consists of spiral surfaces with a common axis of rotation and a common pitch, the rotational reliability for the worst case of all directions is verified.

(5) If the set of standard surfaces consists of surfaces generated by a curve and a translation along a given direction, the rotational reliability for the worst case of all directions is verified.

(6) If the set of standard surfaces consists of a rotational surface generated by a curve and a rotation, the rotational reliability about the worst case of all the directions that are perpendicular to the rotational axis are verified.

Figure 7A:
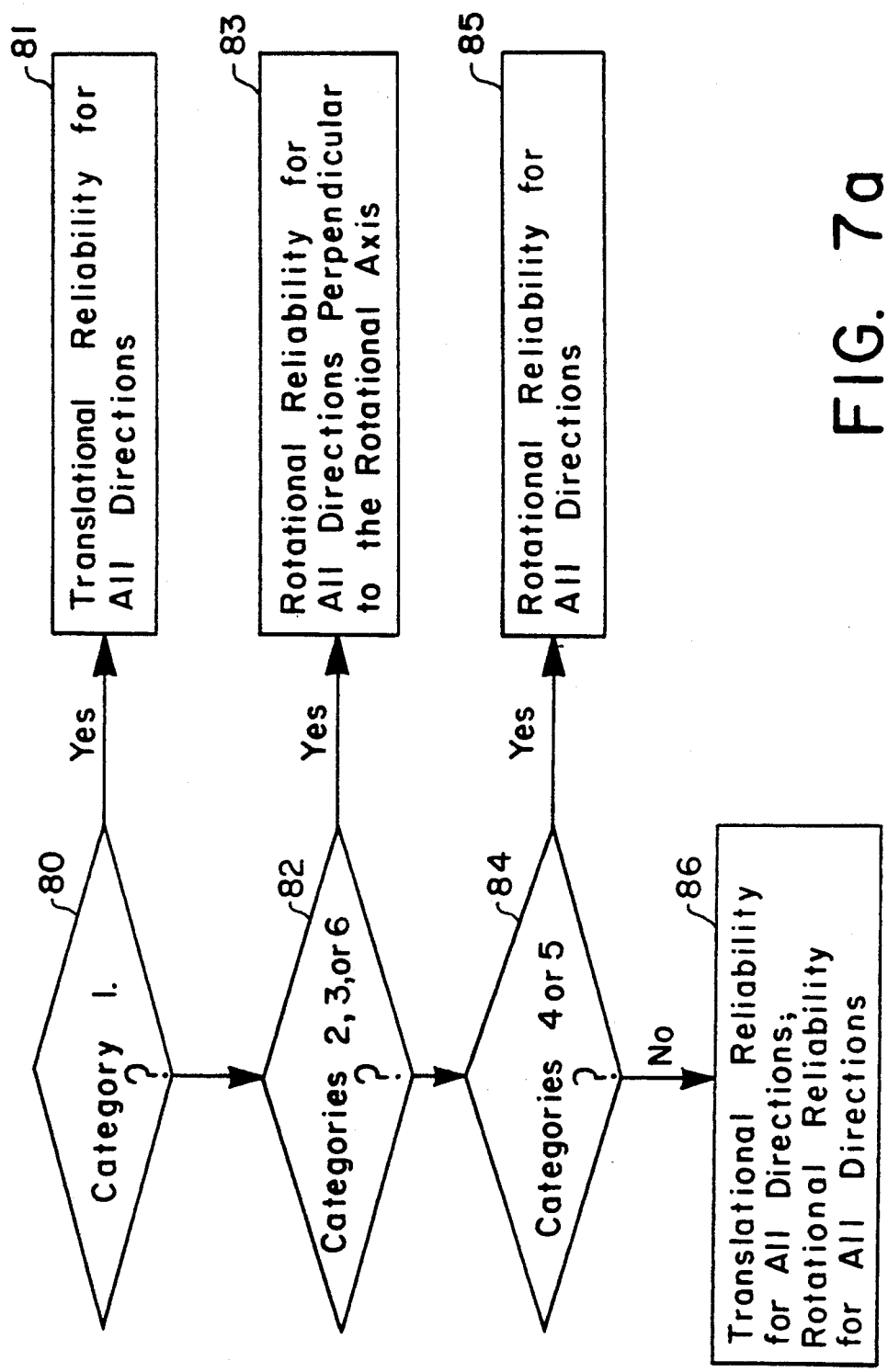
Figure 7B:
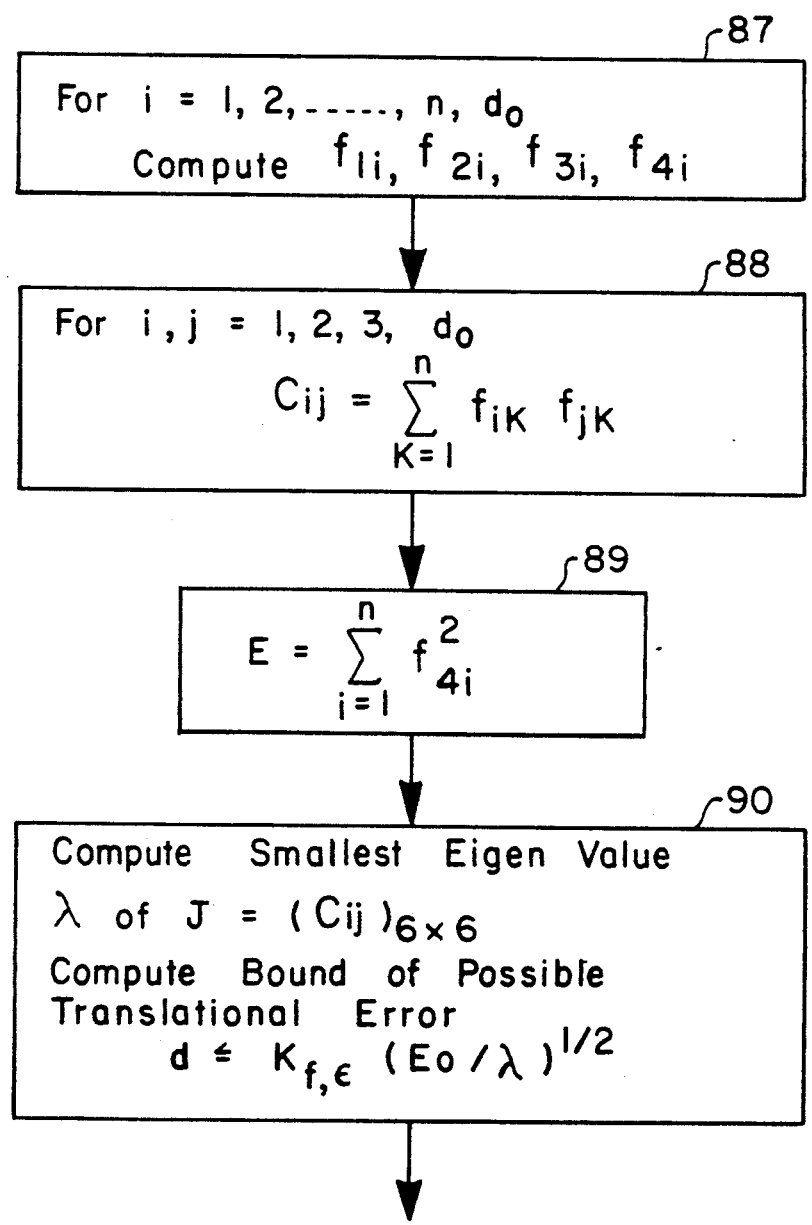
Figure 7C:
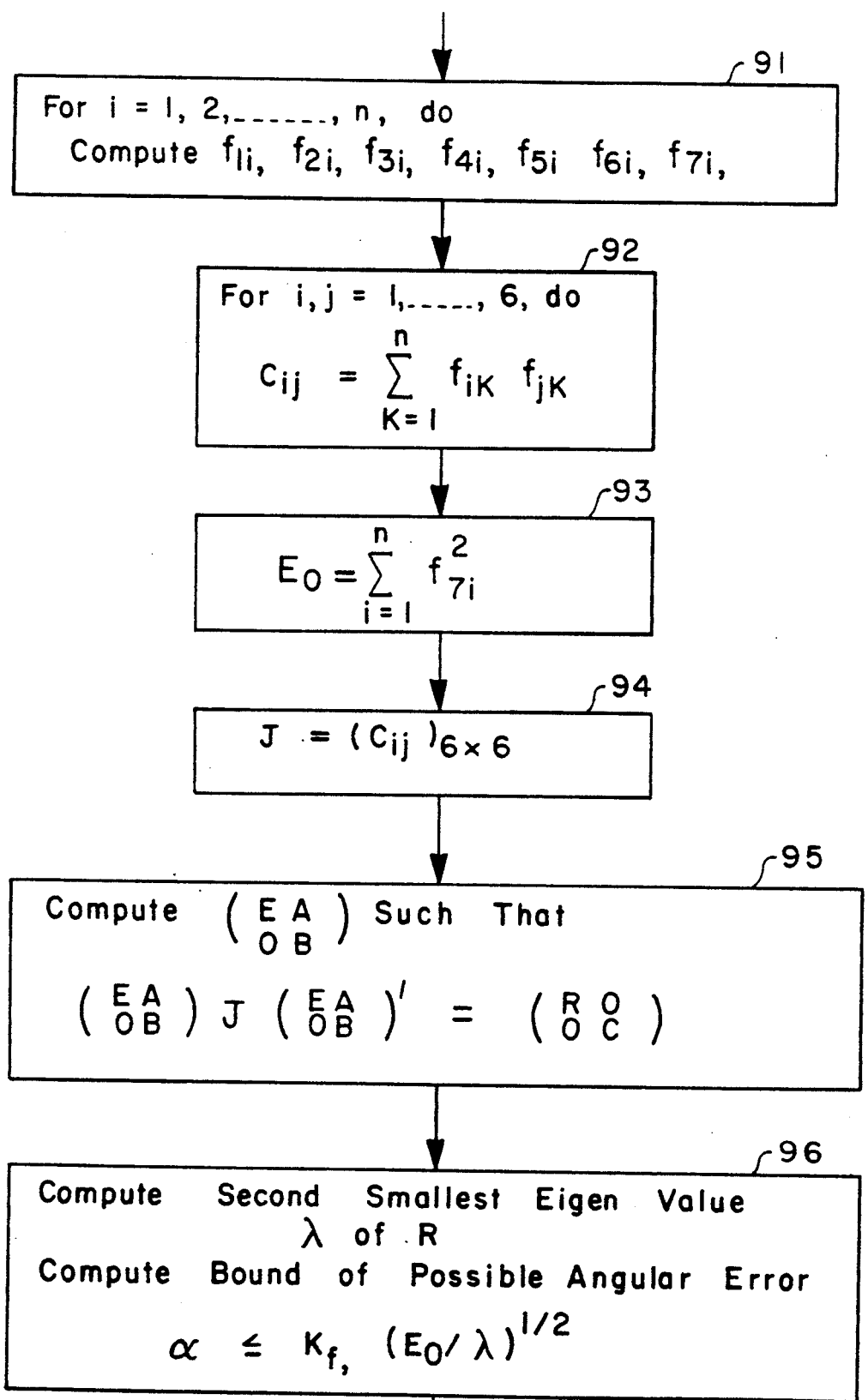
Figure 7D:
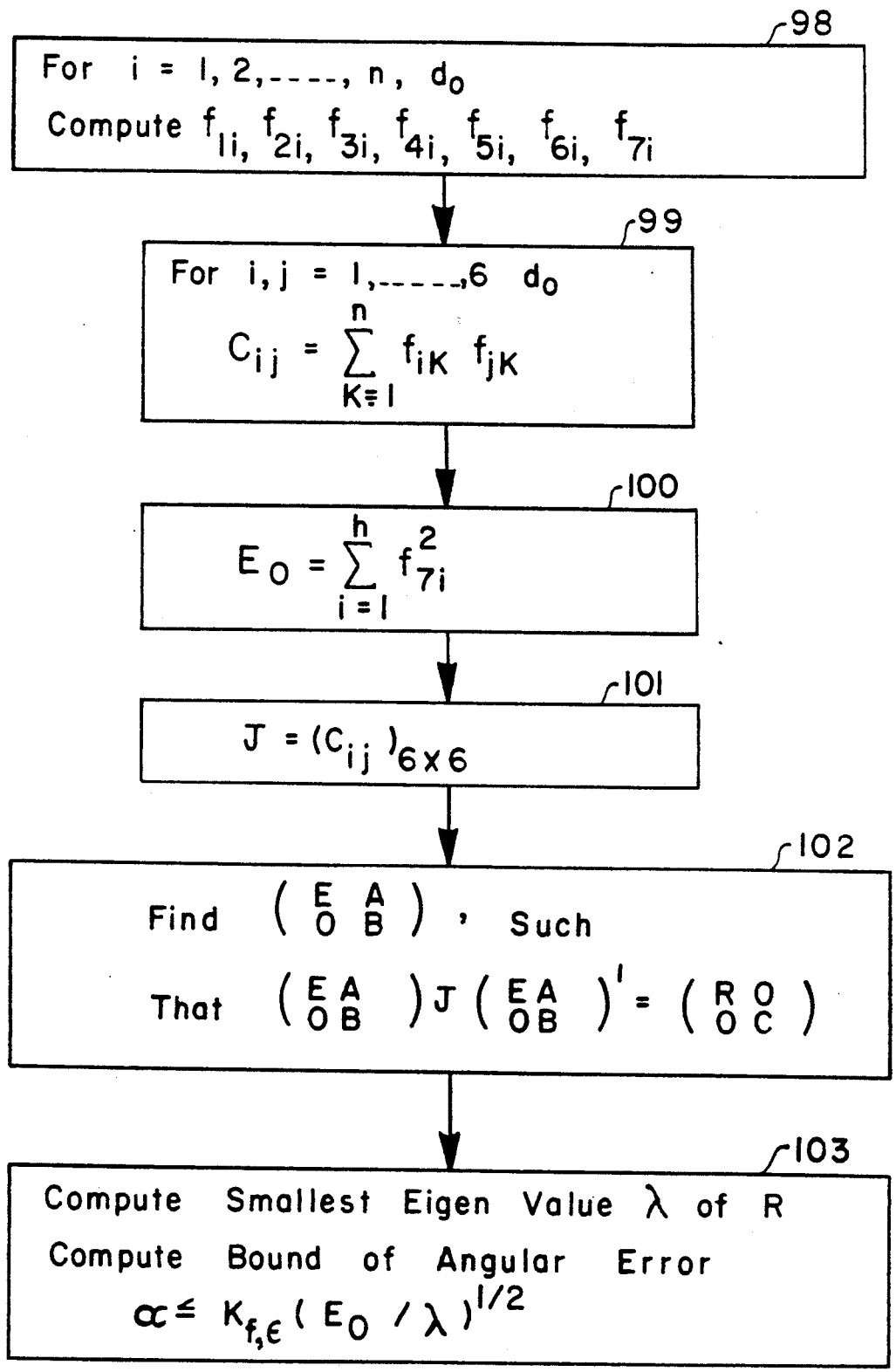

FIGS. 7(a)–(d) depict the flowcharts that summarize the reliability analysis of this invention. FIG. 7(a) depicts a procedure which performs the selection of the appropriate variation of the reliability analysis according to the shape of the standard surfaces of a particular workpiece. At test 80, if the set of standard surfaces belongs to category (1) control is transferred to block 81 in which the translational reliability is analyzed for all directions, as shown in FIG. 7(b). At test 82, if the set of standard surfaces belongs to categories (2), (3) or (6) (i.e. standard surfaces of the workpiece have a common rotational axis), flow passes to block 83 in which the rotational reliability analysis is performed for the directions which are perpendicular to the rotation axis, as depicted in FIG. 7(c). At test 84, if the set of standard surfaces belongs to categories (4) or (5), control passes to block 85 in which the rotational reliability is analyzed for all the directions as depicted by FIG. 7(d). Otherwise, the control passes to block 86 in which the translational reliability analysis is performed for all the directions as depicted in FIG. 7(c) and the rotational reliability analysis for all directions, as depicted in FIG. 7(d).

In FIG. 7(d), $\lambda$ is the smallest Eigen value of R, and in FIG. 7(c), $\lambda$ is the second smallest Eigen value of R. In a two-dimensional case, if the set of standard curves (which are standard surfaces in two dimensions) consists of concentric circles, the translational reliability analysis for the worst case of all planar directions is required. If the set of standard curves consists of parallel straight lines, the rotational reliability analysis about the z-axis is required. Otherwise, both translational reliability analysis for the worst case of all directions and rotational reliability analysis about the z-axis are required.

2.3 METHOD AND SYSTEM FOR DETERMINING SATISFACTORY HOMING TRANSFORMATION

Figure 3B:
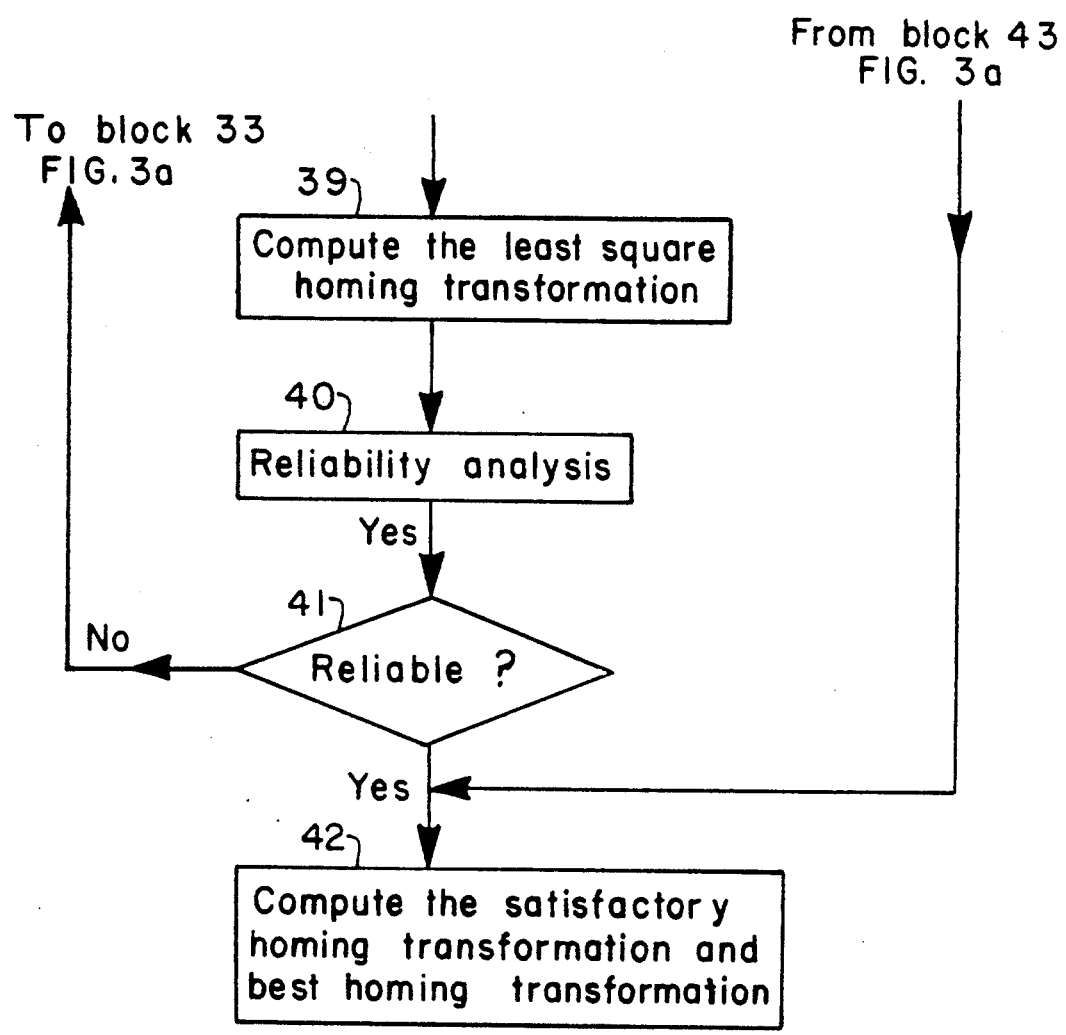

In block 42 of FIG. 3b, the system has already determined the least square homing transformation which aligns the points measured on the standard surfaces of the workpiece with the corresponding home surfaces of the model very closely. Furthermore, at this point, the transformation is sufficiently reliable. In block 42 the system verifies that the transformation satisfies the tolerance requirements specified for the particular mechanical component.

First, a satisfactory homing transformation is determined. This transformation transforms the features measured on the workpiece, as defined by the probed points, within the tolerance zones of the features of the model and the points measured on the envelope surfaces of the workpiece outside the surfaces of the model.

The tolerance specifications can be expressed by a set of inequalities:

$$H_i(E) \leq 0, i=1, \ldots, e.$$

where the values Hi(E) are functions of the transformation E. The transformation E for which the inequalities are satisfied is the satisfactory homing transformation for a given workpiece.

For each inequality, the system defines a cost function $C_i(E)$:

$$\begin{cases} C_i(E) = 0 \text{ if } H_i(E) \leq 0 \\ C_i(E) = H_i(E) \text{ otherwise} \end{cases}$$

and an objective function f(E):

$$f(E) = \sum_{i=1}^{\ell} C_i^2(E).$$

The tolerance requirement is satisfied if and only if the minimum value of f(E) is 0.

Each cost function quantifies to what extent a given inequality is not satisfied. For example, a cost function can be defined as a shortest distance from the position of a point measured on the surface of a workpiece and transformed by E to the corresponding tolerance zone of the model. If the transformed point is within the tolerance zone, the distance and the cost function is zero.

Figure 8A:
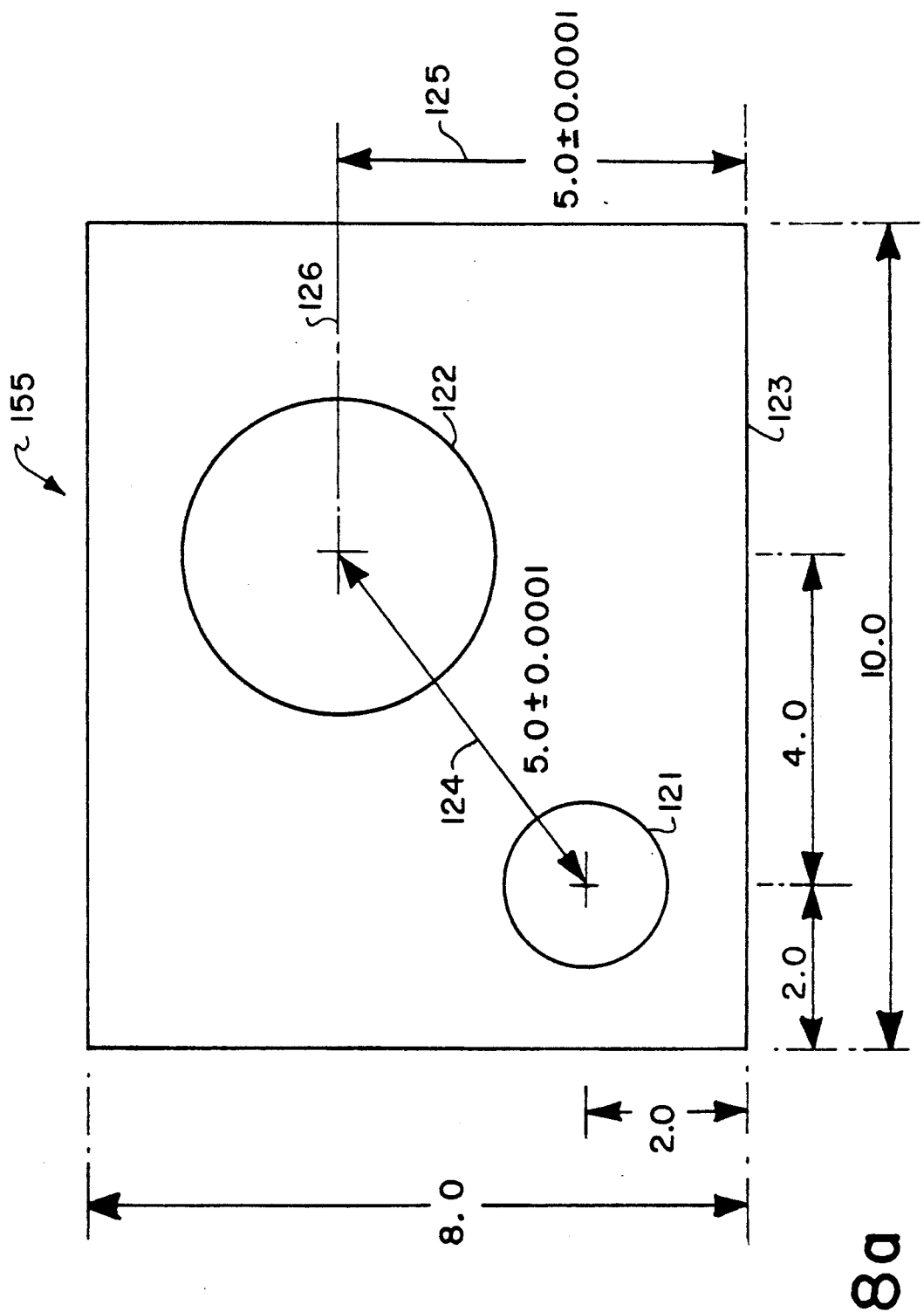
FIGS. 8(a)–(c) illustrates a workpiece with specified tolerances in order to introduce the problem of adjusting the least square homing transformation so that the tolerance specifications are satisfied.
Figure 8B:
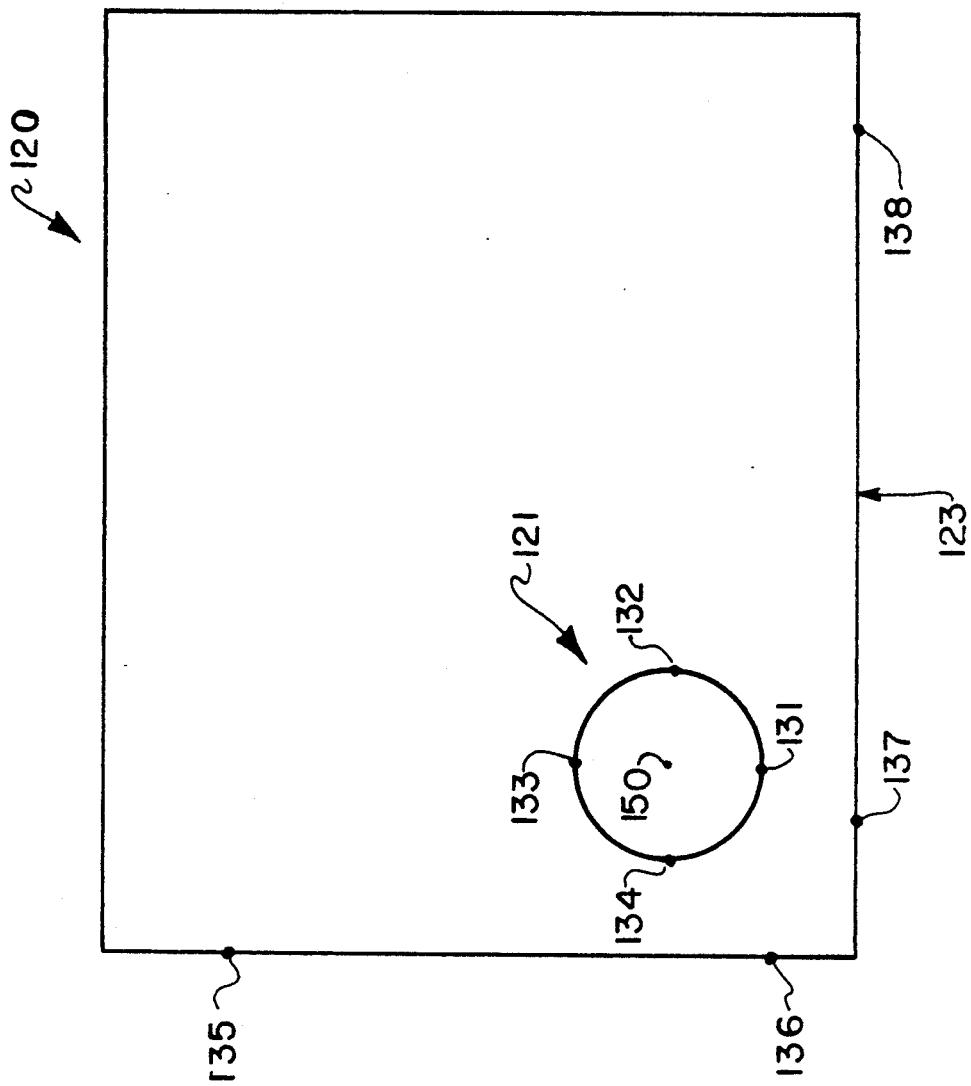
Figure 8C:
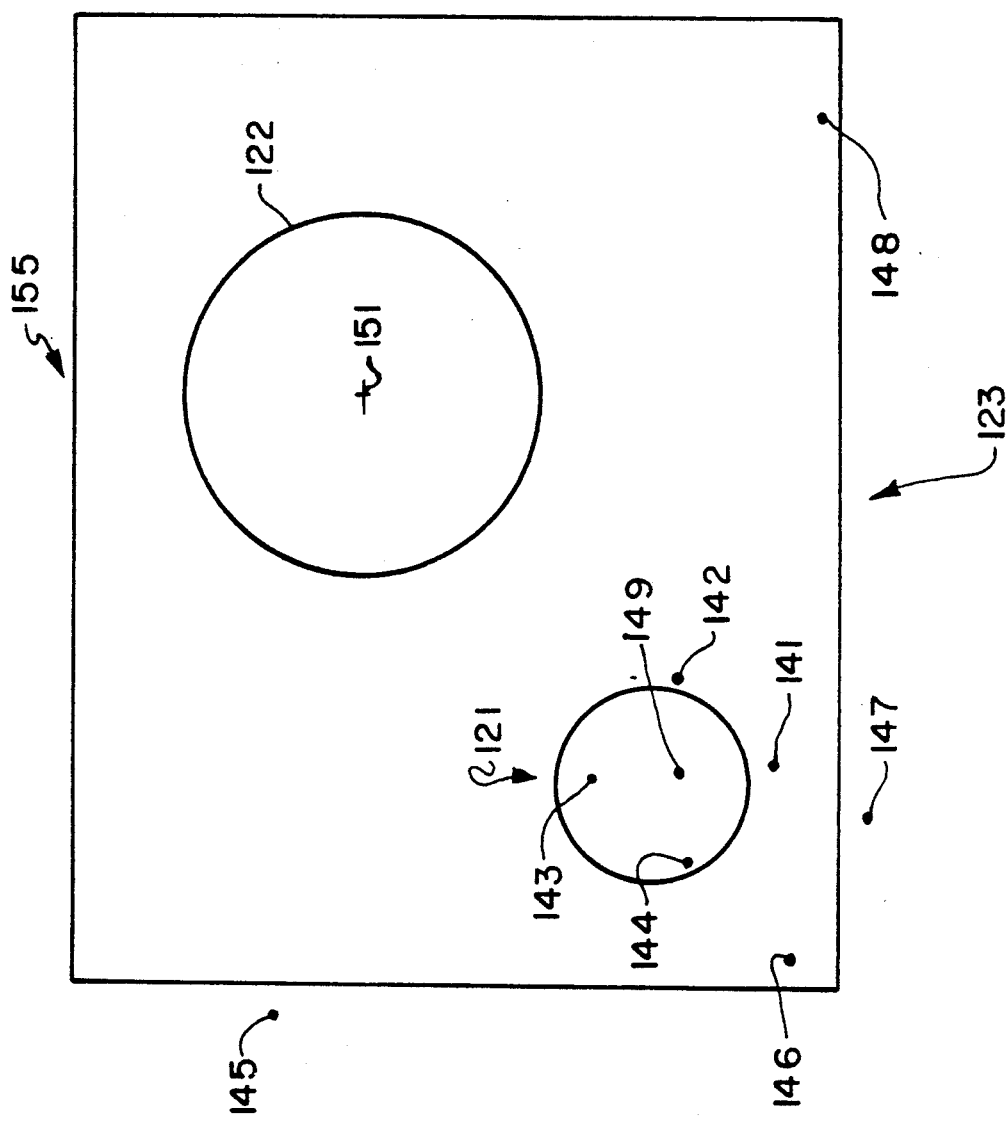

FIGS. 8(a)-(c) is an example which illustrates how the tolerance inequalities are defined. FIG. 8(a) depicts an example of a model 155 of a mechanical component. The dimensions of the component's features and the corresponding tolerances are also stored as part of the model. In this example, the tolerances of all the dimensions are 0.01 inch, except for the distance 124 between the centers of the holes 121 and 122 and the distance 125 between the line 126 passing through the center of the hole 122 and the edge 123. The distances 124, 125 have tolerances 0.0001 inch.

FIG. 8(b) depicts a workpiece 120 randomly or approximately clamped on the machine table. The workpiece 120 has to be machined according to the model 155. At the stage in manufacture illustrated in FIG. 8(b), the hole 121 and the edges of the workpiece have been machined such that the relative position of the hole 121 with respect to the edge 123 is within the tolerance 0.01 inch. Also, eight points, 131-138, have been probed on the workpiece 120. At this point, the satisfactory homing transformation is a transformation that transforms the points measured on the workpiece such that, if the hole 122 were machined on the basis of this transformation, all the tolerance specifications would be satisfied.

Let us assume that a reliable least square homing transformation $E_1$ can be computed on the basis of the measured points 131-138. FIG. 8(c) illustrates the model in which points 141-148 are the measured points 131-138 that have been transformed by the least square homing transformation $E_1$. Note that, in this illustration, the mismatch is deliberately exaggerated so that points 141-148 are not very close to the corresponding home curves (the surfaces are curves in this two dimensional illustration). The location of the center of the hole 121 of the workpiece can be calculated on the basis of the probed points 131-138. Let us denote the center of circle 121 as $\bar{c}_1$, which is illustrated in FIG. 8(b) as point 150. This point is transformed to point $E_1(\bar{c}_1)$, which is indicated in FIG. 8(c) as point 149, by the computed transformation. Let us denote the center 151, of the hole 122, which has not been machined, as point $\bar{c}_2'$. The distance between point $E_1(\bar{c}_1)$ and point $\bar{c}_2'$ is $d(E_1(\bar{c}_1),\bar{c}_2')$ This distance can be calculated and should satisfy the following inequalities $$d(E_1(\bar{c}_1),\bar{c}_2') - 5.0001 \leq O$$

$$4.9999 - d(E_1(\bar{c}_1),\bar{c}_2') \leq O$$

Let us denote point 138 (FIG. 8(b)) measured on the workpiece as point $\bar{p}$. This point is transferred to the point 148 (FIG. 8(c)). Let us denote point 148 as point $E_1(\bar{p})$. $E_1(\bar{p})$ has to be within the tolerance 0.0001 with respect to the edge 123. Let us denote the y-coordinate of edge 123 of the model as $y_0$, and the y-coordinate of $E_1(\bar{p})$ as $Y(E_1(\bar{p}))$. Thus, the following tolerance inequalities can be defined.

$$Y_0 - Y(E_1(\bar{p})) - 0.0001 \leq O$$

$$Y(E_1(\bar{p})) - Y_o - 0.0001 \leq O$$

Similar expressions can be derived for the other measured features. Also, a tolerance zone is defined "outside" of the surfaces of the model in order to define inequalities for the envelope requirement, i.e., the requirement that the points measured on the envelope surfaces should be transformed outside of the model surfaces. The transformation that satisfies these inequalities is a satisfactory homing transformation.

To determine a transformation which satisfies the inequalities of the tolerance and envelope requirements, a cost function $C_i(E)$ is defined for each inequality, and an objective function f(E) is defined as a sum of squared values of cost functions, as shown above. The inequalities that specify tolerance and envelope requirements are satisfied if and only if the minimum value of the objective function is zero.

The least square homing transformation $E = E_{r,v}$ has six parameters $\bar{r} = (u,v,w)$ and $\bar{v} = (x,y,z)$ and the objective function f(E) can be expressed as $f(E) = f(E_{r,v}) = F(u,v,w,x,y,z) = F(X)$, where F(X) is a function of X which is a point or a vector in a 6 dimensional space. Therefore, the problem of determining the minimum value of f(E), which should be zero if tolerance and envelope specifications are satisfied, is equivalent to determining the minimum value of F(X).

Figure 9:
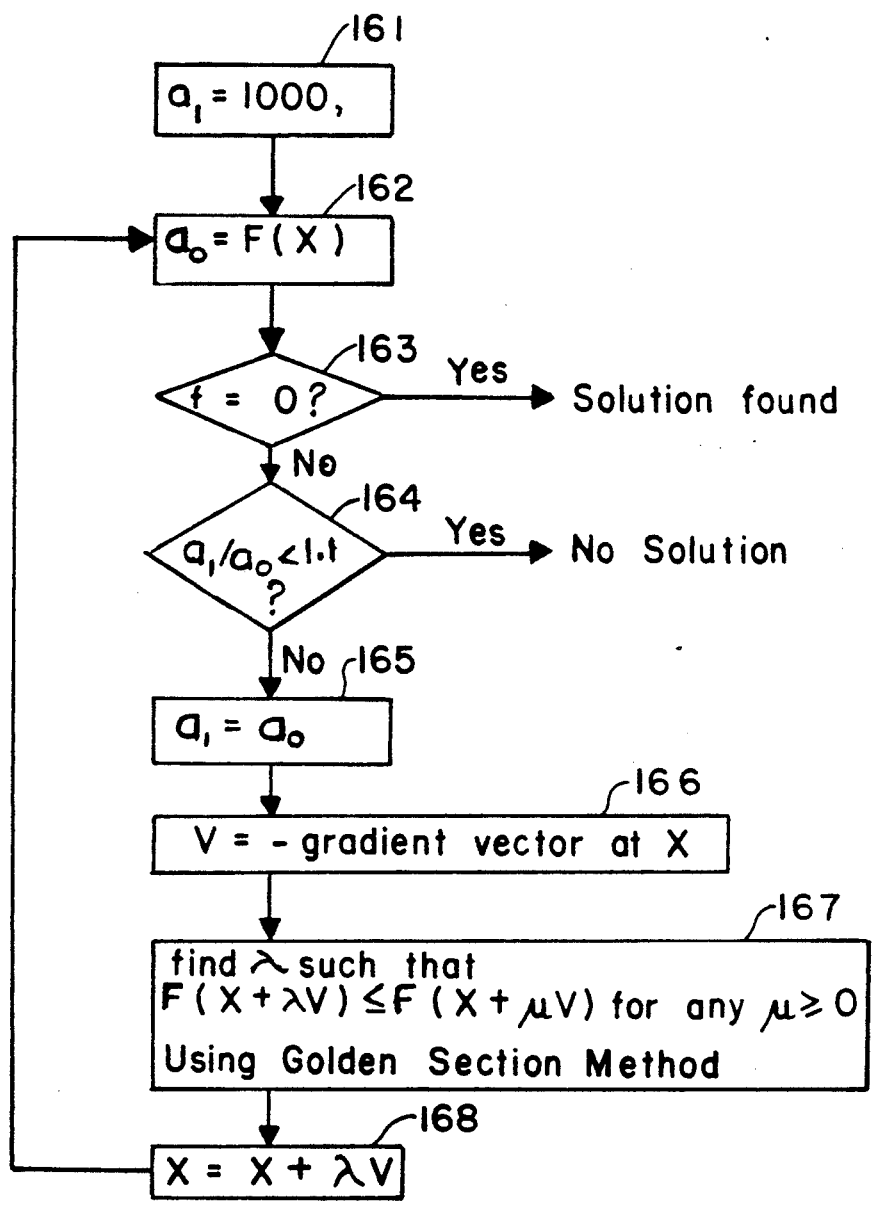
FIG. 9 is a flowchart illustrating the steps of determining satisfactory homing transformation.

If the objective function of the least square homing transformation is not zero, the mountain climbing method, depicted in FIG. 9, is employed for adjusting the least square homing transformation, determined previously, so as to obtain a transformation for which the objective function is zero. In FIG. 9, at block 161, a variable $a_1$ is assigned a large number, for example 1000, which is certainly larger than the current value of F(X). The value of F(X) is computed using the expression for the objective function defined above since $F(X) = f(E_{r,v})$. At block 162, the value of F(X) is assigned to a variable $a_o$. If, at test 163, the value of $a_o$ is 0 (i.e., the value of the objective function is zero), the satisfactory homing transformation is determined and this procedure terminates.

Otherwise, control passes to test 164, where the ratio $a_1/a_o$ is compared to a predetermined constant which is larger than 1, for example 1.1. If the value of the ratio in block 164 is larger than the value of the predetermined constant, control passes to block 165, where the value of $a_o$ is assigned to $a_1$. At block 166, the gradient vector of F(X) is computed by differentiating the parametric representation of the transformation E with respect to each parameter, and the negative value of the gradient is assigned to a variable V. The negative value of the gradient indicates the direction in six dimensional space in which the value of F is decreasing most rapidly. The method of computing the gradient is described in many calculus books, for example, *Differential and Integral Calculus* by R. Courant, chapter 2 (Interscience Publishers Inc. 1936). At block 167, a known Golden Section method is employed for searching the values of F in the direction of the gradient vector, determined previously, in order to determine a variable $\lambda$ such that $F(X+\lambda V) \leq F(X+\mu V)$ for any $\mu \leq 0$. The Golden Section method can be found in a paper by J. Kiefer, Proc. of Amer. Math. Soc. 4 (1953) 502-506. At block 168, the value $X+\lambda V$, is stored in X. From block 168 the control returns to block 162.

The value of $X+\mu V$ determined in block 167 provides the minimum value of F in the negative direction of the gradient and, therefore, the minimum value of the objective function along this direction. Since $X+\mu X$ defines a point in six dimensional space, it also defines a Euclidean transformation. Each new transformation E obtained in block 167 during the iterative process of FIG. 9 is such that the new value of the objective function is less than the value during a previous iteration. This process is repeated until the objective function is reduced to zero (test 163) or the system determines that there is no satisfactory homing transformation (test 164).

It should be noted that in the first iteration of the procedure of FIG. 9, $a_1$ is selected much larger than $a_o$ and, therefore, the value of the ratio $a_1/a_o$ is much larger than the predetermined constant. However, during the subsequent iterations, if, at test 164, $a_1/a_o$ is smaller than or equal to the predetermined constant, the value of F cannot be reduced effectively and it is assumed that the satisfactory homing transformation does not exist.

2.4 METHOD AND SYSTEM FOR DETERMINING BEST HOMING TRANSFORMATION

Figure 10:
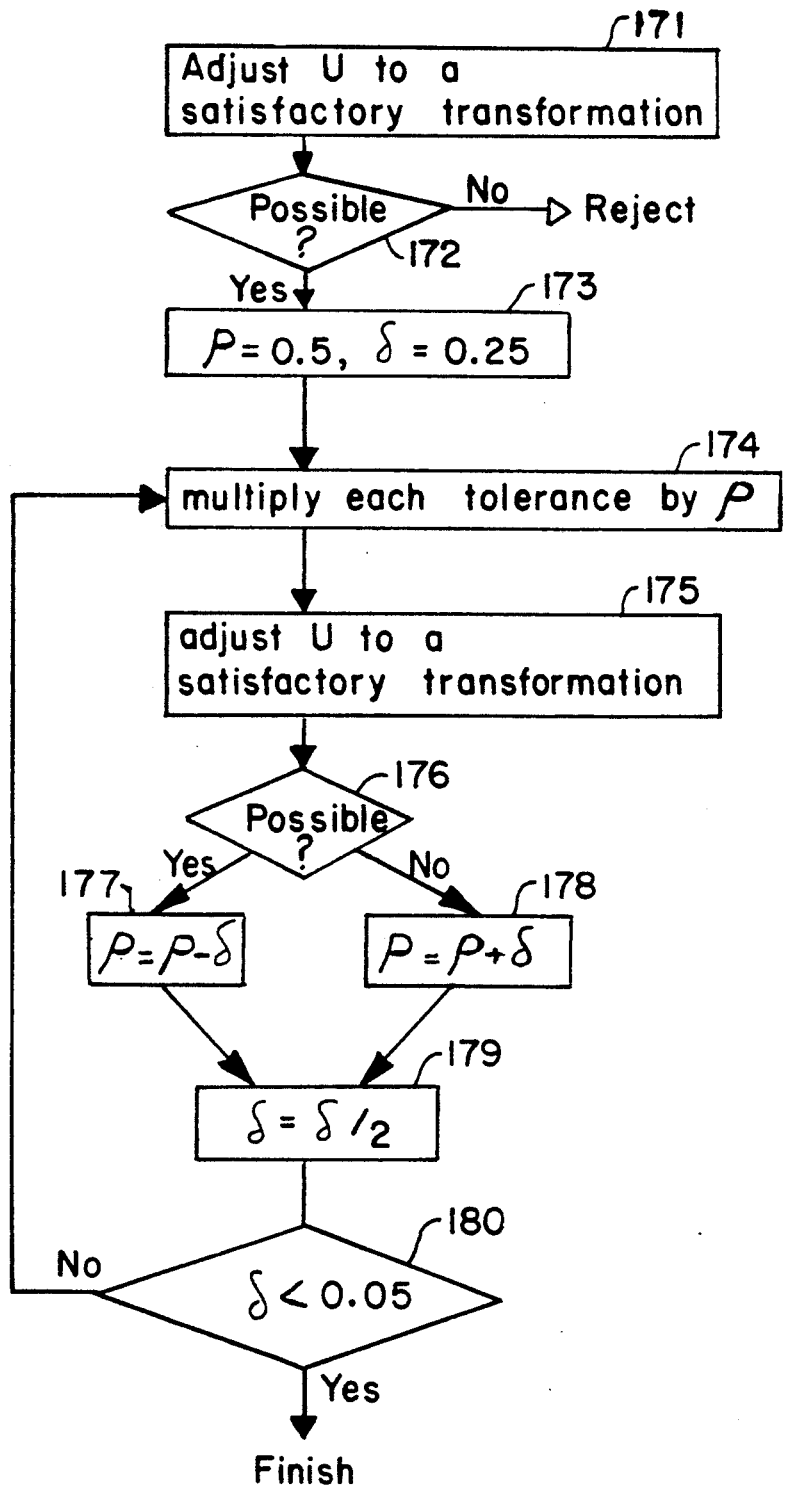
FIG. 10 is a flowchart illustrating the steps of determining the best homing transformation.

The purpose of the procedure depicted in FIG. 10 is to determine a transformation that transforms the points measured on the workpiece such that the tolerances are more stringent than specified. This transformation is referred to herein as "best homing transformation." Blocks 171 and 172 summarize the procedure discussed in conjunction with FIG. 9. At block 171, the transformation U is adjusted to the satisfactory transformation, and, if the satisfactory transformation does not exist (test 172), the system rejects the workpiece. Otherwise, the control passes to block 173 where the variable $\rho$ is assigned the value 0.5 and the variable $\delta$ is assigned the value 0.25. At block 174, each specified tolerance is multiplied by $\mu$. Note that the initial transformation is satisfactory for $\rho=1$, i.e., for the tolerances specified in the model. At block 175, the system attempts to adjust the current homing transformation U to the tolerance zones which are fifty percent narrower than the original tolerances (i.e. $\rho=0.5$). The adjustment is performed using the maintain climbing method of FIG. 9. If such transformation is determined, the control passes to block 177, where $\rho$ is further reduced. Otherwise, if the transformation that satisfies new tolerances does not exist, control passes to block 178, where $\rho$ is increased by the value of the variable $\delta$. From block 177 or 178, control passes to block 179, where the constant $\delta$ is reduced by a factor of two. At test 180, if $\delta$ is less than a predetermined constant, for example 0.05, the procedure terminates and the satisfactory homing transformation, determined at block 175 during the current iteration, is the best homing transformation. Otherwise, the control passes back to block 174.

2.5 AUTOMATIC PROBING TECHNIQUE FOR "THREE-DIMENSIONAL" WORKPIECES

As indicated in conjunction with FIG. 3 (block 43), after the approximate position and orientation of the workpiece is established and at least 3 non-collinear points are probed interactively, the method of this invention provides a capability of determining an accurate transformation without a significant human interaction by utilizing an automatic probing technique described below. Although this technique permits probing surfaces of the workpiece automatically, manual probing is still preferred if a surface is "irregular", for example, if it contains holes, if there is a clamp placed on a surface, or if there is a possibility that a spindle of a machine would collide with the workpiece or the clamps.

Since, initially, only an approximate transformation is determined, the error of this transformation might be significant in comparison to the size of a given face. Therefore, in certain situations, the system may erroneously move a probe to a surface which was not intended to be probed. To overcome this difficulty, the method of this invention utilizes a "modifying while probing" technique. According to this technique, an approximate transformation is improved on the basis of each new point, so that the probability of locating the next point correctly is increased with each measured point.

Figure 11:
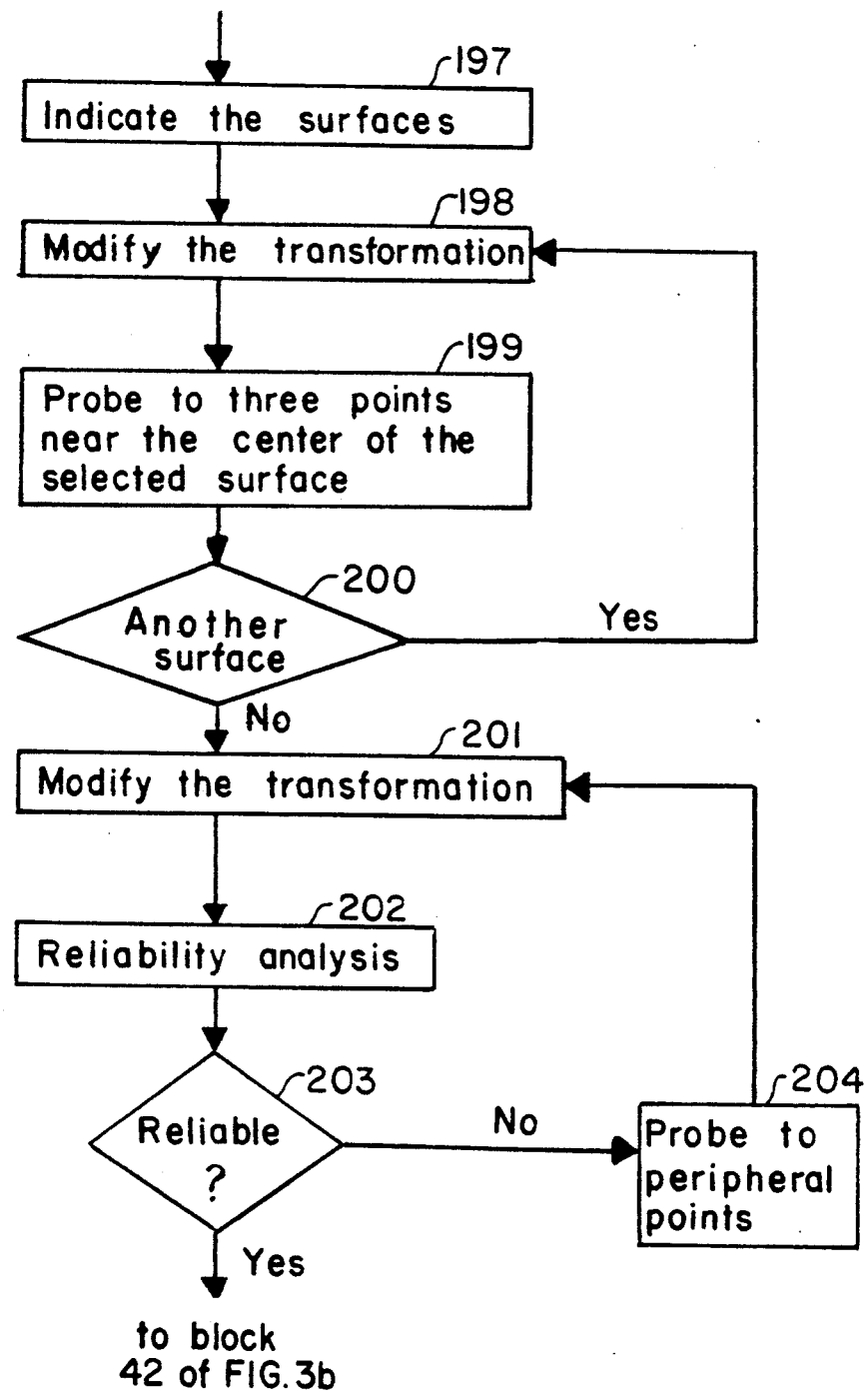
FIG. 11 is a flowchart illustrating the steps of the technique for determining the position and orientation of the "three-dimensional" workpiece by collecting the surface points automatically.

A flowchart of this technique is depicted in FIG. 11. The process starts at block 197, where a user interactively indicates the surfaces that should be gauged automatically on the displayed model using a mouse. It should be noted that, at this point, the coordinates of at least 3 non-collinear points on the surfaces of the workpiece have been measured interactively. At block 198, the least square homing technique is applied to the coordinates of the points which were probed previously in order to improve the approximate homing transformation. At block 199, the system measures the coordinates of three points which are located close to the center of one of the surfaces selected at block 197. The improved approximate transformation computed at block 198, allows for identifying the central area of the surface. The largest surface of the workpiece is selected first in order to reduce a possibility of probing a wrong surface. This is easily done since the surfaces of the workpiece are stored in the system as the model.

At test 200, if there are surfaces that have not been probed, the control passes to block 198, in which the approximate transformation is improved on the basis of the points probed previously including the new points collected at block 199. This iterative process terminates when all the surfaces selected at block 197 are gauged. Then, the control passes to block 201, where the transformation is further improved on the basis of the coordinates of all the measured points. Next, at block 202, the reliability analysis of the resultant transformation is performed according to the procedure discussed in conjunction with FIGS. 7(a)-(d). If the transformation is sufficiently reliable (test 203), control passes from test 203 to block 42 in FIG. 3(b) where the satisfactory and best homing transformations are computed and the procedure terminates.

However, if at block 203, the transformation derived on the basis of the points measured in the central areas of the surfaces is not sufficiently reliable, the points in the peripheral portions of the surfaces are measured. Note that, at this point, the system has improved the approximate transformation and, thus, the points that are closer to the edges of the surfaces can be probed without a significant risk of missing the desired surfaces.

At block 204, the system obtains coordinates of the points located at the peripheral locations of the first selected surface. The flow returns to block 201 where the transformation is modified on the basis of the points probed at the peripheral portions of a given surface. This iterative process continues until the transformation is sufficiently reliable for computing satisfactory and best homing transformations in block 42 in FIG. 3(b).

3. SIMPLIFIED TECHNIQUES FOR WORKPIECES WITH SPECIAL GEOMETRIC PROPERTIES

As indicated in conjunction with FIG. 2, the method of this invention provides a simplified techniques for determining the position and orientation of a workpiece which has special geometric properties. Two types of workpieces exhibit these special characteristics: (1) workpieces that can be defined in a two-dimensional space; and (2) generally three dimensioned workpieces which have one planar standard surface which is parallel to the machine table where the workpiece is mounted. To derive a transformation matrix for such workpieces a user does not have to specify the correspondence of the standard surfaces of the workpiece and the model. Instead, position and orientation of such workpiece can be determined from the coordinates of points located on the boundary formed by intersection of a plane parallel to the machine table, and the surfaces of the workpiece if all such points are located on the standard surfaces and the boundary is not symmetric. Furthermore, the method of this invention provides a technique of measuring and digitizing sequences of such boundary points automatically (hereinafter mesh-routing technique).

3.1 MESH-ROUTING TECHNIQUE

Figure 12:
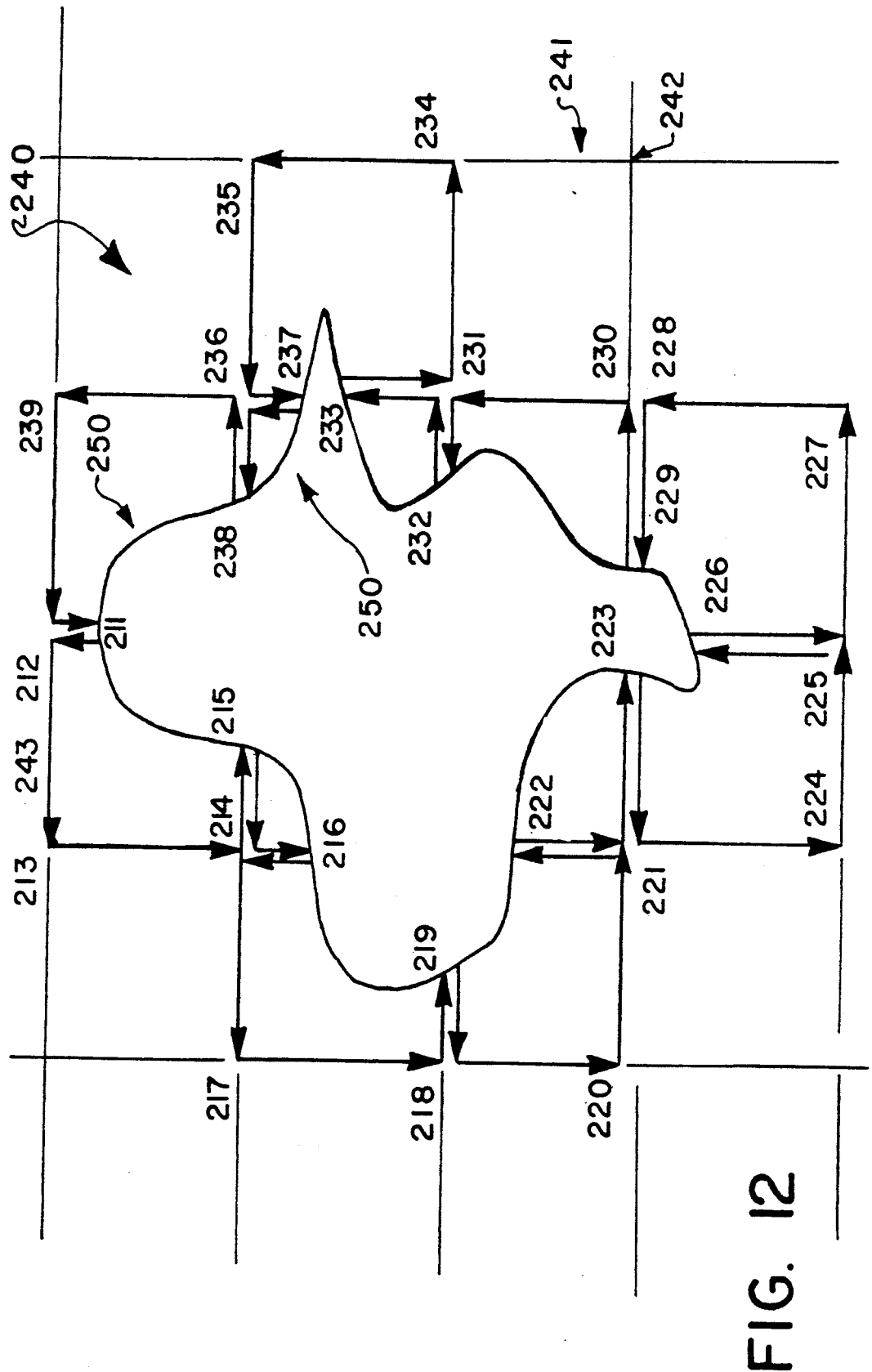
FIG. 12 is an example of probe movement during mesh routing.

The mesh-routing technique comprises the following steps. First, a mesh that covers the machine table is defined in the software of the gauging system 1. FIG. 12 depicts an object 250 which is placed on the software-defined mesh 240 that comprises edges, for example 241, intersecting at nodes, for example, 242. Note that the mesh size (i.e. the distance between two adjacent nodes) and the angle at which mesh edges intersect can be flexibly defined as a trade-off between the desired number of digitized points and the speed of data collection.

Next, a user moves the probe to the boundary of the workpiece and digitizes the first point. In response, the software of the gauging system adjusts the mesh such that the first digitized point is located on one of the mesh edges. Let us assume that the first digitized point is point 211 (FIG. 12). Thereafter, the system moves the probe to the nearest intersection of the mesh edges (point 212) and changes the direction of the probe so that it moves along an intersecting edge 243.

Figure 13:
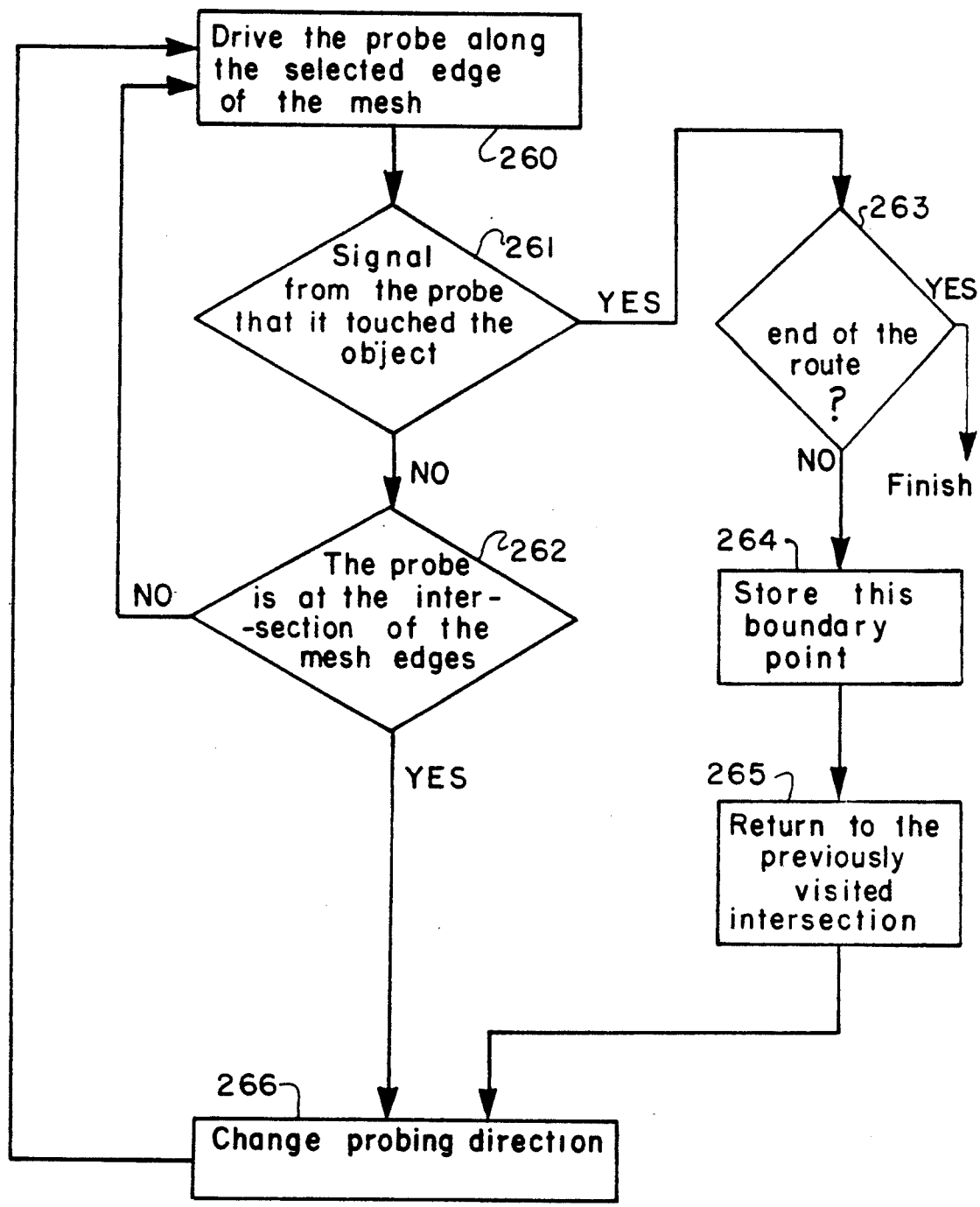
FIG. 13 is a flowchart illustrating the steps of the mesh routing technique.

The remaining steps of the mesh routing technique are illustrated in FIG. 13. The system moves the probe along the selected edge of the mesh (block 260) until it receives a signal indicating that the probe touched the boundary of the workpiece (test 261) or until the probe reaches a node of the mesh (test 262).

If, at test 261, the probe came in contact with the boundary of the workpiece before it reached the next node of the mesh, the control is transferred to test 263, where the coordinates of this new boundary point are compared to the coordinates of the end of the route. If the probe has traveled around the perimeter of the boundary the process terminates. Otherwise, control is transferred to block 264, where the coordinates of the point are stored in memory of the gauging system. Thereafter, the system moves the probe back along the same edge to the node that was visited prior to measuring the last boundary point (block 265).

From block 265 control is transferred to block 266, where the direction of the probe is changed, for example, by 90° counterclockwise, such that the probe continues moving along a different edge of the mesh. If the probe reaches a node before encountering the boundary (test 262), the control is transferred to block 266, where the direction of probing is changed. From block 266 control returns to block 260, and this iterative process continues until all the points on the intersection of the mesh edges and the boundary of the workpiece are measured and stored. As illustrated in FIG. 12, the probe visits points 211 through 237, as indicated by the arrows. As a result, points 211, 215, 216, 219, 222, 223, 226, 229, 232, 233, 237 and 238 are digitized as the boundary of the workpiece.

The mesh routing technique is also applicable to digitizing an outer boundary of an unknown object. For a sufficiently small mesh size, a sequence of boundary points measured around the perimeter is sufficient to reverse-engineer a boundary of an object.

3.2 METHOD AND SYSTEM FOR DETERMINING POSITION AND ORIENTATION OF ESSENTIALLY "TWO-DIMENSIONAL" WORKPIECES

The automatic probing technique for workpieces that are essentially two-dimensional mechanical objects, which have boundaries consisting of finished straight lines and circles, comprises the following steps. First, the system probes several points on the boundary of a workpiece and computes the curvature of the curve that interpolates these points. A sequence of points of approximately identical curvature define the first geometrical element (a line or a circle) of the boundary. Typically, there are several geometrical elements of the model that have essentially identical curvature as the first extracted element of the workpiece and, therefore, there are several possible ways of matching this boundary element to the corresponding element of the model.

The system continues collecting boundary data until a point is detected that significantly changes the curvature of the previously probed points and, therefore, belongs to an adjacent element of the workpiece. Since this point has to correspond to a point located on the adjacent element of the model, it provides a constraint that narrows the scope of possible transformations. At this point, all the possible transformations are computed and stored as a set S of possible transformations $T_i$ in S.

To eliminate erroneous transformations from the set S, the system probes additional points on the boundary of the workpiece. Each possible transformation $T_i$ in S is then applied to the coordinates of each new point $\bar{p}$. If $T_i$ is a correct transformation and if point $\bar{p}$ is not on the boundary of a clamp, $T_i(\bar{p})$ (i.e., the point where $\bar{p}$ is transformed by $T_i$) should be on or near the boundary of the model. $T_i(\bar{p})$ is not on or near the boundary of the model only if (1) $T_i$ is an incorrect transformation and it should be eliminated from the set S or (2) point $\bar{p}_i$ is located on the clamp. It should be noted that, if $\bar{p}$ was measured on the boundary of the clamp, $T_i(\bar{p})$ should be transformed outside of the boundary of the model.

Therefore, the system computes the distance d from $T_i(\bar{p})$ to the boundary of the model. If the absolute value of d is zero or a relatively small number (i.e., $|d| < d_o$, where do is a predetermined constant), the point $\bar{p}$ has been measured on the boundary of the workpiece and a given transformation T is still in the set S of possibly valid transformations. If the distance d is less than $-d_o$, the transformed point $T_i(\bar{p})$ is "inside" the boundaries of the model, which is impossible, and, therefore the transformation $T_i$ is incorrect and it is eliminated from the set of possible transformations. If the distance d is greater than $d_o$, $T_i(\bar{p})$ is outside the boundaries of the model and, therefore, $\bar{p}$ is either on the boundary of the clamp or $T_i$ is an incorrect transformation. Such transformation is marked in the system memory by the point $\bar{p}$.

After each transformation of the set S has been applied to a measured point $\bar{p}$ and, if there is no transformation that can transform a given point to the boundary of the model (all the transformations are marked by $\bar{p}$), the point $\bar{p}$ is located on the clamp. In order to determine the orientation of the clamp, the machine probes the next point. Since the dimensions of the clamp are stored in the system, several points measured on the clamp provide sufficient information to enable the tool to "step" over the clamp.

At the end of the probing path each remaining transformation in the set is a correct transformation. If the path is not rotationally symmetric, one transformation should be left in the set. This resultant transformation can be improved by applying the Least Square Homing technique discussed in conjunction with FIG. 4.

Figure 14A:
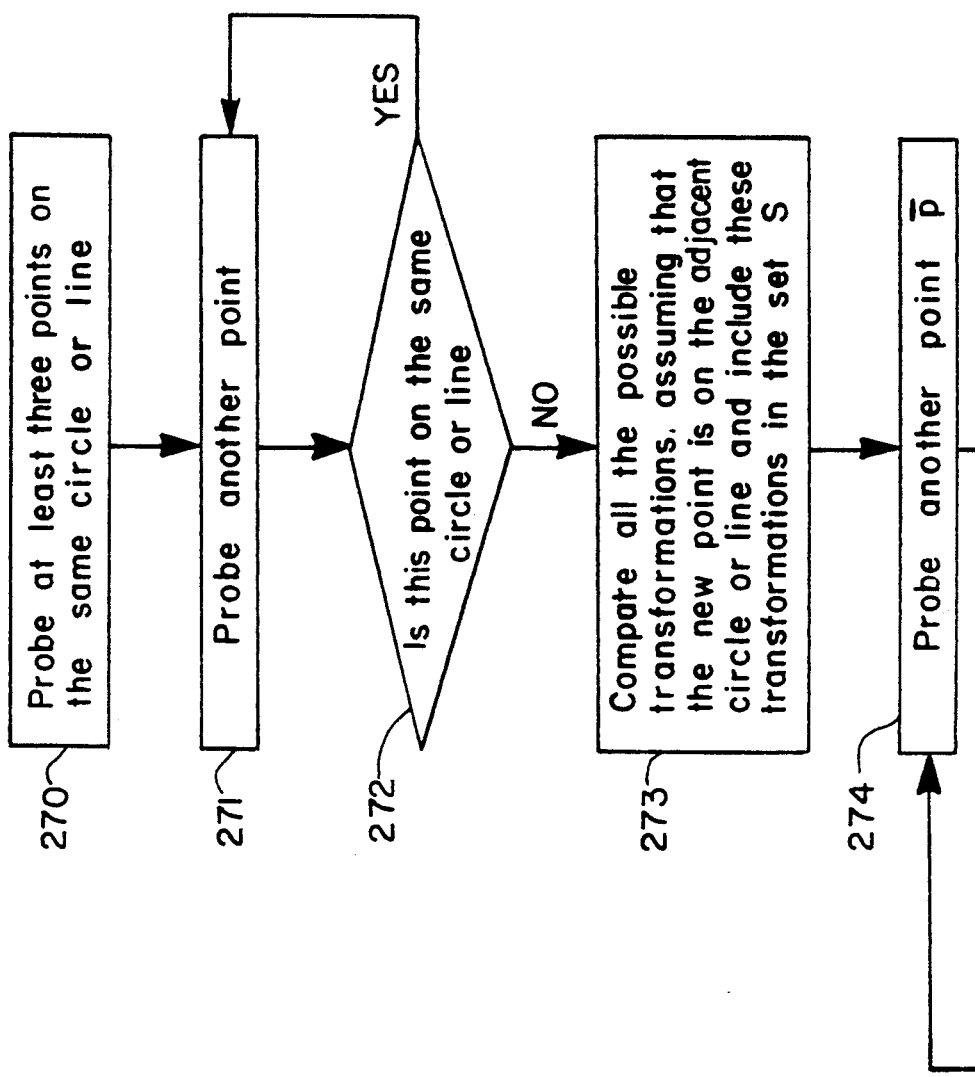

FIGS. 14(a) and 14(b) illustrate the steps of this technique. First, a sufficient number of points is probed in order to determine the curvature of the first element (block 270). At block 271, the system continues probing points until a point on the next element is detected (test 272). Then, flow passes to block 273, where a set S of possible transformations $T_i$ is computed on the basis of the location of the first element and the location of the point of the second element. Thereafter, the system continues to probe additional points (block 274) until the probe arrives at the end point (test 275). If the probe is at the end point, the control passes to block 284, where the least square homing transformation (which reliability is analyzed), the satisfactory homing transformation, and the best homing transformation are computed on the basis of the transformations in the set S, using the techniques described above. As indicated, if the workpiece is not rotationally symmetric, only one transformation remains in set S.

If the probe is not at the end of the route, at block 276, the system selects a transformation $T_i$ from the set S and applies it to the point $\bar{p}$ measured at block 274. If the distance d from the transformed point $T_i(\bar{p})$ to the boundary of the model is greater than $d_o$ (test 277), this transformation $T_i$ is marked by $\bar{p}$ (block 278). Otherwise, if $d < -d_o$ (test 279), the transformation $T_i$ is deleted from the set (280). Note that if $-d_o \leq d \leq d_o$ the transformation remains in the set and it is not marked by $\bar{p}$. This iterative process continues until each $T_i$ in S has been applied to $\bar{p}$ (test 281). If every transformation $T_i$ in S is marked by $\bar{p}$ (test 282), the system retrieves the stored dimensions of the clamp and moves the probe over the clamp (block 283).

3.3 METHOD AND SYSTEM FOR DETERMINING POSITION AND ORIENTATION OF WORKPIECES WITH A PLANAR SURFACE

Figure 15:
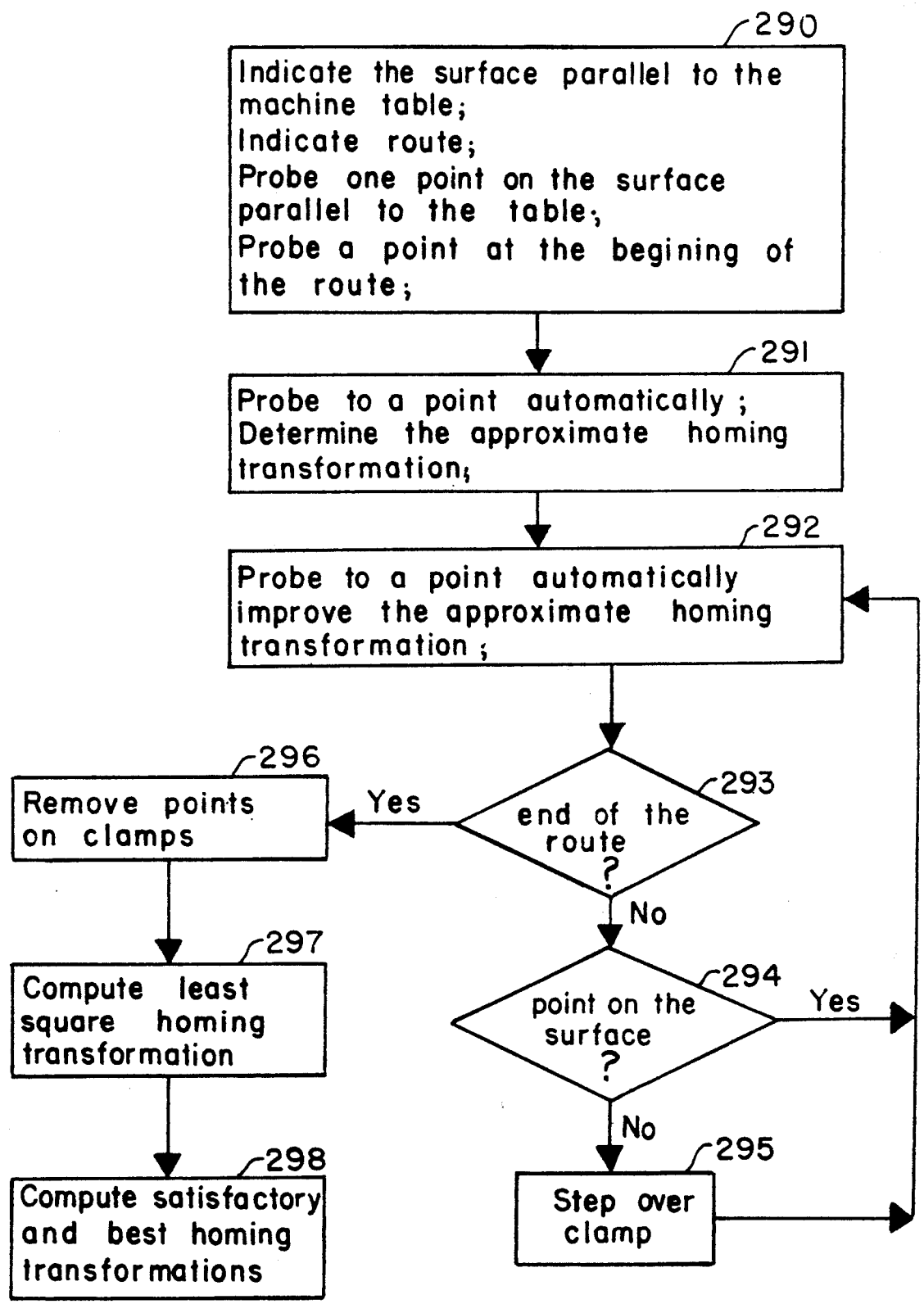
FIG. 15 is a flowchart illustrating the steps of determining the position and orientation of a workpiece, which has a planar surface.

Frequently, a workpiece has one standard planar surface P, which is parallel to the machine table, and also, the workpiece can be intersected by a plane Q, parallel to P, such that the intersection is with the standard surfaces only and the boundary of the intersection is not symmetric. A simplified technique illustrated in FIG. 15 is applicable to such a workpiece. The process starts at block 290, where a user indicates on the screen of the CAD/CAM system a planar surface P' of the model and a plane Q' which is parallel to P' (P' and Q' correspond to P and Q of the workpiece respectively). Also, a user indicates a starting point of a probing route on the boundary of the intersection of Q' and the model surfaces. Next, a user measures a point on the planar surface P of the workpiece using the probe in order to determine the distance from the machine table to P. Then a user positions the probe approximately at the starting point of the probing route. On the basis of this data, the system automatically adjusts the position of the probe so that it is on the intersection of the plane Q and the workpiece.

Then, flow passes to block 291 where the system starts moving the probe along the specified route using the Mesh Routing technique described above. After the next point is measured on the boundary of the workpiece, the system computes the approximate transformation. This computation is possible because the problem is two-dimensional and, therefore, the starting point of the route restricts the possible transformations to a rotation which is determined by measuring the second point. Next, at block 292, the system measures the coordinates of another point and applies the closest tangent homing technique to improve the approximate transformation. Then, if the probe has not reached the end of the route (test 293), the system checks if the new point can be transformed to a point on the boundary of the model (test 294). If so, flow returns to block 292 and the iterative process continues. Otherwise, the new point has been measured on the surface of the clamp. Thus, control passes to block 295, where the system directs the probe to step over the clamp. This operation is feasible because the dimensions of the clamp are stored in the system. Subsequently, flow returns to block 292 and the data collection process continues until the probe reaches the end of the route.

After all the points of the specified route are measured and stored, the control is transferred to block 296, where the coordinates of points located on the clamps are removed from the set of measured data. Thereafter the method flow passes to block 297 where the least square homing transformation is derived on the basis of the entire set of data. Next, if the transformation is reliable, the satisfactory homing transformation and the best homing transformation are computed at block 298.

This technique can be extended to workpieces which have at least one planar surface, which is not necessarily parallel to the machine table. In this case, a user has to identify this surface by moving the probe to one of its points. Also, a user has to specify a probing route which is parallel to this plane. Next, the system automatically probes three points on the surface and, thus, determines its position and orientation. Thereafter, the above technique can be applied.

4. MACHINING OF IDENTICAL WORKPIECES

The gauging system of this invention can store a sequence of the previously performed operations. This feature is useful for repeated machining of identical workpieces. If a second workpiece is placed approximately the same as the first workpiece, the gauging system can measure the coordinates of the points which have been measured for the first workpiece, automatically, even though human interaction was involved in determining the accurate position and orientation of the first workpiece.

Figure 16:
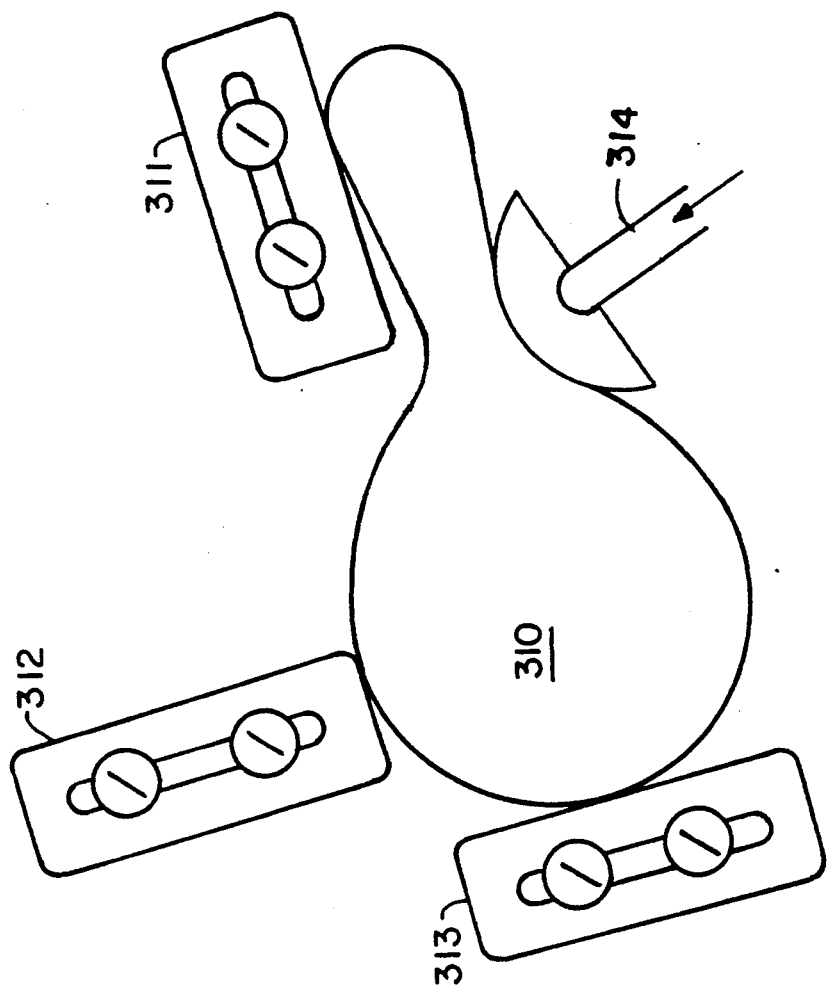
FIG. 16 illustrates a workholder employed for manufacturing identical mechanical components.

Simple workholders can be utilized for machining a large number of identical workpieces. FIG. 16 illustrates the locating components of a workholder that can hold identical workpiece in the same location of the machine table during repeated loading and unloading cycles. Also, additional clamping components may be utilized. After setting the workholder arbitrarily for mounting the first workpiece, the system can probe the workpiece and modify the tool path according to the method of this invention. Subsequently, the workpieces are clamped in the workholder and machined using the modified tool path without further probing.

In FIG. 16, the workpiece 310 is fixtured with standard locating elements 311, 312, 313, and a clamp 314. As indicated, additional clamping components may be utilized. A user can tighten or loosen clamp 314 for reloading the workpieces. As indicated, a user does not need to fixture the standard elements accurately, because the gauging system of this invention adjusts the tool paths on the basis of the points probed on the first workpiece mounted in the workholder. Since the position of the workpiece is determined by the standard elements 311, 312, 313, which are set permanently, every workpiece is fixtured in the same position and orientation. Therefore, the toolpaths, which were modified for the first workpiece, can be used for the subsequent workpieces.

As mentioned previously, the system of this invention provides a capability for digitizing and modeling the geometric features of the workpiece. Mesh routing technique, discussed above, can be utilized for digitizing "2-dimensional" objects. Also, the gauging system of this invention can be utilized for determining the expressions that describe the surfaces of the "3-dimensional" objects.

5. TECHNIQUE FOR DIGITIZING SURFACES OF "THREE-DIMENSIONAL" WORKPIECES

In order to obtain a numerical representation of a surface of a three-dimensional object and to store the representation in the memory of the system, a user interactively indicates to the CAD/CAM system the type of the surface that will be digitized and then the system selects a parametric representation of the surface accordingly using known techniques. For example, if a user indicated that a particular surface is a plane, which is parallel to the machine table, the system selects an expression with one parameter t:

$$z - t = 0.$$

Generally, an expression with m parameters, $t_1, \ldots, t_m$, where m is the degree of freedom, is chosen by the system:

$$a(t_1, \ldots, t_m, x, y, z) = 0$$

Next, coordinates of a plurality of points on the surface of the workpiece are measured using one of the techniques described above. For example, the points can be probed interactively by a user controlling the sensor of the machine using a peripheral device. After a set of coordinates of $n > m$ points $\bar{p}_i$ is obtained, the system determines the values of $t_1, \ldots, t_m$, such that the sum of squared distances from each point $\bar{p}_i$ to the surface $S(t_1, \ldots, t_m)$ is minimized. This computation is performed using known geometrical techniques. The obtained expression $S(t_1, \ldots, t_m)$ is the numerical representation of the surface stored in memory of the system of this invention.

Subsequently, the system eliminates the points that are erroneously measured on an incorrect surface from the set of measured points so as to determine a more accurate representation of the surface. Let us assume that the sum of squared distances from each point $\bar{p}_i$ to the determined surface $S(t_1, \ldots, t_m)$ is $s_1$. First, the system eliminates from the set of measured points a point $\bar{p}_j$ which is the furthest from the computed representation of the surface. Then, the system uses a new set of points to determine new parameters of the expression representing the surface such that the sum of squared distances from the points $p_i$ (for all $i \neq j$) to the surface defined by the parametric representation is minimized. Let us assume that, as a result, the sum of squared distances from the points in the new set to the new representation of the surface is $s_2$. Next, the system computes the value $F = s_1(n-m-1)/s_2(n-m)$, and compares it with the limit of degrees of freedom $(n-m, n-m-1)$ in the F-test table. If the value of F is greater than the limit, the point $\bar{p}_j$ is not on the correct surface and it is eliminated from the set of measured points, otherwise $\bar{p}_j$ is on the correct surface. If $\bar{p}_j$ is measured on the incorrect surface, the process is repeated until it is determined using the technique described above that the point, which is the furthest from the computed representation of the surface, is measured on the correct surface. Thus, the final numerical representation of the surface is determined on the basis of points measured on the correct surface.

The embodiments of the invention described above are presented for purposes of illustration and should not be construed as limiting the invention in any way. Doubtless, other embodiments may be conceived which would not depart from the spirit of the present invention, which scope is defined by the following claims.

We claim:

1. For use in connection with a machine, said machine being a machine tool or an inspection system, a method for determining the position and orientation of a workpiece in relation to a known coordinate system in order to enable the machine tool to engage such workpiece accurately or to enable proper inspection of such workpiece by the inspection system, said machine tool or said inspection system employing a data processing system where numerical data corresponding to a model of such workpiece is stored, comprising the steps of:

measuring, by means of at least one sensor, coordinates of at least one reference point on the workpiece;

determining an approximate Euclidean transformation which indicates the position and orientation of such workpiece with respect to the model on the basis of said at least one reference point;

measuring, by means of at least one sensor, coordinates of a plurality of points on a plurality of surfaces of the workpieces such that the information regarding the correspondence between the measured points on the workpiece and virtual surfaces, represented by the model of the workpiece, is provided to the data processing system; and improving the accuracy of the approximate transformation so as to obtain an improved Euclidean transformation which indicates the position and orientation of the workpiece with respect to the model, and in which the sum of the squared distances from the plurality of points of the workpiece to the corresponding virtual surfaces of the model is minimized, wherein the step of improving the approximate transformation so as to obtain the improved Euclidean transformation comprises modifying the approximate transformation in accordance with a result of applying a transformation, which is not a Euclidian transformation, to the coordinates of the plurality of points measured on the plurality of surfaces of such workpiece or to the coordinates of the plurality of points which have been operated on by the approximate Euclidean transformation;

whereby the machine is controllable to engage or operate upon the workpiece with a tool, sensor or the like, on the basis of the improved transformation.

2. The method of claim 1 further comprising the steps of:

selecting certain of the virtual surfaces represented by the model; and wherein the coordinates of the plurality of the points are determined by moving a sensor to such points when the surface of the workpiece upon which they lie corresponds to the selected virtual surface of the model.

3. The method of claim 1 wherein the step of improving the transformation comprises:

determining a plane $TP_i$ which is tangent to a virtual surface $S_i$ represented by the model that corresponds to a surface of the workpiece where a point $p_i$ on the surface is measured so that a point of tangency of $S_i$ and $TP_i$ is closer to $\bar{p}_i$ than any other point on $S_i$;

computing a rotational transformation vector $\bar{r}$ and a translational transformation vector $\bar{v}$, such that after applying a tangent transformation $T_{r,v}$ to each point $p_i$, the sum of squared distances from each point $T_{r,v}(\bar{p}_i)$ having had the tangent transformation applied thereto, to the corresponding tangent plane $TP_i$ is minimized; and modifying the transformation by multiplying the transformation by the Euclidean transformation $U_{r,v}$ which is computed on the basis of the vectors $\bar{r}$ and $\bar{v}$.

4. The method of claim 3 wherein the step of computing the transformation vectors further comprises selecting a closest tangent homing transformation $T_{r,v}$ if tangent transformation can not be computed uniquely, such that the sum of squared distances from each point $T_{r,v}(\bar{p}_i)$, having the closest tangent transformation applied thereto, to a corresponding point $U(\bar{p}_i)$, having the transformation U applied thereto, is minimized.

5. The method of claim 1 further comprising the step of minimizing an objective function of the improved transformation so as to obtain a transformation which transforms the coordinates of the plurality of points so as to satisfy tolerance requirements of the workpiece stored in the data processing system.

6. The method of claim 5 wherein the step of minimizing the objective function comprises:

obtaining a minimum gradient direction data by computing a derivative of a parametric representation of the improved transformation with respect to each parameter of the representation; and applying a Golden Section search method to the objective function so as to determine a minimum value of the function in the gradient direction.

7. The method of claim 6 further comprising the steps of:

computing new tolerance requirements by multiplying each value of the tolerance requirements by a narrowing factor variable;

determining the transformation which transforms the coordinates of the points so as to satisfy the new tolerance requirements; and assigning a new value to the narrowing factor variable.

8. The method of claim 1 further comprising the step of performing a reliability analysis of the improved transformation so as to determine a bound of an error of a computed position and orientation of the workpiece, which computed position and orientation is the numerical data corresponding to the model transformed by an inverse of the improved transformation.

9. The method of claim 8 wherein the step of performing the reliability analysis comprises performing a translational reliability analysis.

10. The method of claim 9 wherein the step of performing the translational reliability analysis comprises:

simulating a translation of the points of the workpiece along a specified direction;

computing an increase in a sum of squared distances from the points of the workpiece to the corresponding virtual surfaces represented by the model during the translation; and applying F-test analysis to a ratio of a sum of squared distances computed after simulating the translation and a sum of squared distances computed before simulating the translation so as to determine a bound of a translational error of the improved transformation.

11. The method of claim 8 wherein the step of performing reliability analysis comprises performing a rotational reliability analysis.

12. The method of claim 11 wherein the step of performing rotational reliability analysis comprises:

simulating a rotation of the points about a specified axis;

computing an increase in a sum of squared distances from the points of the workpiece to the corresponding virtual surfaces during rotation; and applying F-test analysis to the ratio of a sum of squared distances computed after simulating the rotation and a sum of square distances computed before simulating the rotation so as to determine a bound of an angular error of the improved transformation.

13. The method of claim 1 further comprising the step of modifying tool path data, stored in the data processing system for machining the workpiece, using the improved transformation.

14. The method of claim 1 further comprising:
computing a z-axis transformation, using the improved transformation, which correlates a z-direction of the workpiece with a z-axis of the model;
automatically moving a machine table on which a workpiece is placed, so as to align the z-direction of the workpiece with the z-axis of the model; and
modifying the tool path data, stored in the data processing system for machining the workpiece, using a transformation which is a product of the inverse of the improved transformation and the z-axis transformation.

15. A method for determining the position and orientation of a workpiece having at least one planar surface using a machine employing a data processing system where numerical data corresponding to a model of the workpiece, with a corresponding planar surface, is stored, comprising the steps of:
moving a sensor according to a probing route, lying in a probing plane parallel to the planar surface of the workpiece;
measuring coordinates of a plurality of points located on the probing route;
determining an approximate Euclidean transformation which correlates the measured coordinates of points located on the probing route to a boundary in the model corresponding to the probing plane of the workpiece, using the coordinates of the points that are measured at an initial stage of moving the sensor; and
improving the accuracy of the approximate Euclidean transformation on the basis of the coordinates of additional points measured on the probing route to obtain an improved transformation which indicates the position and orientation of the workpiece with respect to the model.

16. The method of claim 15, further comprising the step of locating a clamp by identifying at least one point which cannot be transformed by the improved transformation to a corresponding virtual surface represented by the model.

17. For use in connection with a machine, said machine being a machine tool or an inspection system, a method for determining the position and orientation of a workpiece in relation to a known coordinate system in order to enable the machine tool to engage such workpiece accurately or to enable proper inspection of such workpiece by the inspection system, said machine tool or said inspection system employing a data processing system where numerical data corresponding to a model of such workpiece is stored, comprising the steps of:
measuring coordinates of a plurality of points on a boundary of the workpiece, which boundary is parallel to a machine table;
interpolating the coordinates so as to determine a plurality of geometrical elements of the boundary;
computing a set of possible transformations on the basis of two of the geometrical elements determined on the boundary that correlates the plurality of the geometrical elements of the boundary of the workpiece to a plurality of corresponding geometrical elements represented by a corresponding boundary of the model; and
eliminating erroneous transformations from the set of possible transformations so as to determine a correct transformation which indicates the position and orientation of the workpiece with respect to the model;
whereby the machine is controllable to engage or operate upon the workpiece with a tool, sensor or the like, on the basis of the improved transformation.

18. The method of claim 17 wherein the step of eliminating erroneous transformations comprises eliminating transformations which transform the coordinates of a certain point in the set inside the corresponding boundary represented by the model such that transformed coordinates of the certain point are removed from the corresponding boundary represented by the model by a distance greater than a predetermined constant.

19. The method of claim 18 further comprising the step of locating a clamp by measuring coordinates of a point, which, under each transformation in the set of possible transformations, is transformed outside the corresponding boundary represented by the model to a distance greater than the predetermined constant.

20. A method of digitizing coordinates of a boundary of a workpiece held in a machine comprising the steps of:
moving a sensor along a first direction;
changing the first direction of motion of the sensor by a specified angle after the sensor has traveled a predetermined distance;
reversing the first direction of motion of the sensor if the sensor contacts the boundary of the workpiece; and
determining coordinates of a plurality of points located on the boundary of the workpiece, said points providing digitized representation of said boundary,
wherein after the sensor contacts a given point on the boundary, the motion of the sensor is such that the sensor starts to move so as to return to the given point, and the sensor does not return to the given point if another boundary point is encountered by the sensor before the given point.

21. For use in connection with a machine, said machine being a machine tool or an inspection system, a method for determining the position and orientation of a workpiece in relation to a known coordinate system in order to enable the machine tool to engage such workpiece accurately or to enable proper inspection of such workpiece by the inspection system, said machine tool or said inspection system employing a data processing system where numerical data corresponding to a model of such workpiece is stored, comprising the steps of:
determining an approximate transformation which correlates coordinates of at least one point measured on the workpiece to at least one virtual surface represented by the model;
measuring, by means of at least one sensor, coordinates of a plurality of points on a first surface of the workpiece;
improving the accuracy of the approximate transformation so as to obtain an improved transformation which indicates the position and orientation of the workpiece with respect to the model, and in which a sum of squared distances from each point measured on the workpiece to the corresponding virtual surfaces represented by the model is minimized; and determining a location of a second surface on the workpiece by applying an inverse of the improved transformation to the numerical data represented by the model, so that the second surface may be used to further improve the accuracy of the improved transformation, whereby the machine is controllable to engage or operate upon the workpiece with a tool, sensor or the like, on the basis of the improved transformation.

22. A method of claim 21 wherein the step of improving the transformation comprises determining a plane $TP_i$ which is tangent to a virtual surface $S_i$ represented by the model that corresponds to a surface of the workpiece where a point $p_i$ on the surface is measured so that a point of tangency of $S_i$ and $TP_i$ is closer to $\bar{p}_i$ than any other point on $S_i$;

computing a rotational transformation vector $\bar{r}$ and a translational transformation $\bar{v}$, such that after applying a tangent transformation $T_{r,v}$ to each point $p_i$, the sum of squared distances from each point $T_{r,v}(p_i)$ having had the tangent transformation applied thereto, to the corresponding tangent plane $TP_i$ is minimized; and modifying the transformation by multiplying the transformation by the Euclidean transformation $U_{r,v}$, which is computed on the basis of the vectors $\bar{r}$ and $\bar{v}$.

23. The method of claim 21 further comprising the step of performing a reliability analysis of the improved transformation so as to determine a bound of an error of a computed position and orientation of the workpiece, which computed position and orientation is the numerical data corresponding to the model transformed by an inverse of the improved transformation.

24. For use in connection with a machine, said machine being a machine tool or an inspection system, a method of determining a geometric representation of a surface of a workpiece in order to enable the machine tool to engage such workpiece accurately or to enable proper inspection of such workpiece by the inspection system, said machine tool or said inspection system employing a data processing system, comprising the steps of:

(a) measuring a set of coordinates of a plurality of points of the surface of the workpiece;

(b) computing a geometric representation of the surface such that a sum of squared distances from the plurality of points of the workpiece to the geometric representation of the surface is minimized;

(c) determining coordinates of a first point in the set which is removed from the geometric representation of the surface by a greater distance than any other point in the set;

(d) computing a new geometric representation of the surface on the basis of a new set, which is the set of coordinates of the plurality of points without the coordinates of said first point; and (e) determining if the first point is erroneously measured on an incorrect surface by applying F-test analysis to a ratio of the sum of squared distances from the points in the set to the geometric representation of the surface and the sum of squared distances from the points of the new set to the new geometric representation of the surface; and (f) if the first point has been measured on the incorrect surface, replacing the set by the new set and replacing the geometric representation by the new geometric representation, and repeating the steps (c)–(f);

whereby the machine is controllable to engage or operate upon the workpiece with a tool, sensor or the like, on the basis of the geometric representation.

25. A machine tool for precision machining and inspection of arbitrarily or approximately placed workpieces comprising:

a CAD system where numerical data corresponding to a model of the workpiece is stored;

sensor means for measuring coordinates of points on a plurality of surfaces of the workpiece; and data processing means for determining a Euclidean transformation which indicates the position and orientation of the workpiece so as to enable precision machining and inspection of arbitrarily or approximately placed workpieces; said transformation correlating a position and orientation of the plurality of points of the workpiece to a plurality of corresponding virtual surfaces represented by the model so that the sum of the squared distances from the plurality of points of the workpiece to the corresponding virtual surfaces of the model is minimized, wherein the means for determining comprises means for applying a transformation, which is not a Euclidian transformation, to the coordinates of the plurality of points measured on the plurality of surfaces of such workpiece or to the coordinates of the plurality of points which have been operated on by an approximate Euclidean transformation.

26. An apparatus for determining the position and orientation of a workpiece comprising:

a data processing system where numerical data corresponding to a model of the workpiece is stored;

means for determining coordinates of at least one reference point on the workpiece;

means for determining an approximate Euclidean transformation which indicates the position and orientation of the workpiece with respect to the model on the basis of said at least one reference point;

means for determining coordinates of a plurality of points, and providing the information regarding the correspondence between the measured points on the workpiece and virtual surfaces, represented by the model of the workpiece, to the data processing system; and means for improving the accuracy of the approximate Euclidean transformation so as to obtain an improved transformation which indicates the position and orientation of the workpiece with respect to the model, and in which the sum of the squared distances from the plurality of points of the workpiece to the corresponding virtual surfaces of the model is minimized, wherein the means for improving the accuracy of the approximate transformation so as to obtain the improved Euclidean transformation comprises means for modifying the approximate transformation in accordance with a result of applying a transformation, which is not a Euclidian transformation, to the coordinates of the plurality of points measured on the plurality of surfaces of such workpiece or to the coordinates of the plurality of points which have been operated on by the approximate Euclidean transformation.

27. The apparatus of claim 26 further comprising:
means for selecting certain of the virtual surfaces represented by the model;
wherein the coordinates of the plurality of the points are determined by moving a sensor to such points when the surface of the workpiece upon which they lie corresponds to the selected virtual surface of the model.

28. The apparatus of claim 26 wherein the means for improving the transformation comprises:
means for determining a plane $TP_i$ which is tangent to a virtual surface $S_i$ represented by the model that corresponds to a surface of the workpiece where a point $\bar{p}_i$ on the surface is measured so that a point of tangency of $S_i$ and $TP_i$ is closer to $\bar{p}_i$ than any other point on $S_i$;
means for computing a rotational transformation vector $\bar{r}$ and a translational transformation vector $\bar{v}$, such that after applying a tangent transformation $T_{r,v}$ to each point $\bar{p}_i$, the sum of squared distances from each point $T_{r,v}(\bar{p}_i)$ having had the tangent transformation applied thereto, to the corresponding tangent plane $TP_i$ is minimized; and
means for modifying the transformation by multiplying the transformation by the Euclidean transformation $U_{r,v}$, which is computed on the basis of the vectors $\bar{r}$ and $\bar{v}$.

29. The apparatus of claim 26 further comprising means for minimizing an objective function of the improved transformation so as to obtain a transformation which transforms the coordinates of the points so as to satisfy tolerance requirements of the workpiece stored in the data processing system.

30. The apparatus of claim 29 wherein the means for minimizing the objective function comprises:
means for obtaining a minimum gradient direction data by computing a derivative of a parametric representation of the improved transformation with respect to each parameter of the representation; and
means for applying a Golden Section search method to the objective function so as to determine a minimum value of the function in the gradient direction.

31. The apparatus of claim 26 further comprising means for performing a reliability analysis of the improved transformation so as to determine a bound of an error of a computed position and orientation of the workpiece, which computed position and orientation is the numerical data corresponding to the model transformed by an inverse of the improved transformation.

32. The apparatus of claim 31 comprising:
means for simulating a translation of the points of the workpiece along a specified direction;
means for computing an increase in a sum of squared distances from the points of the workpiece to corresponding virtual surfaces represented by the model during the translation;
means for applying F-test analysis to a ratio of a sum of squared distances computed after simulating the translation and a sum of squared distances computed before simulating the translation so as to determine a bound of a translational error of the improved transformation;
means for simulating a rotation of the points about a specified axis;
means for computing an increase in a sum of squared distances from the points of the workpiece to the corresponding virtual surfaces during rotation; and
means for applying F-test analysis to the ratio of a sum of squared distances computed after simulating the rotation and a sum of square distances before simulating the rotation so as to determine a bound of an angular error of the improved transformation.

33. The apparatus of claim 26 further comprising means for modifying tool path data, stored in the data processing system for machining the workpiece, using the improved transformation.

34. The apparatus of claim 26 further comprising:
means for computing a z-axis transformation using the improved transformation, which correlates a z-direction of the workpiece with a z-axis of the mode; and
means for automatically moving a machine table on which a workpiece is placed, so as to align the z-direction of the workpiece with the z-axis of the model;
means for modifying the tool path data, stored in the data processing system for machining the workpiece, using a transformation which is a product of the inverse of the improved transformation and the z-axis transformation.

35. An apparatus for determining the position and orientation of a workpiece having at least one planar surface comprising:
a data processing system where numerical data corresponding to a model of the workpiece is stored;
means for moving a sensor according to a probing route lying in a probing plane parallel to the planar surface of the workpiece;
means for measuring coordinates of a plurality of points located on the probing route;
means for determining an approximate Euclidean transformation which correlates the coordinates of the points measured on the probing route to a boundary in the model corresponding to a probing plane of the workpiece using the coordinates of the points that are measured at an initial stage of moving the sensor; and
means for improving the accuracy of the approximate Euclidean transformation on the basis of the coordinates of additional points measured on the probing route to obtain an improved transformation which indicates the position and orientation of the workpiece with respect to the model.

36. An apparatus for determining a position and an orientation of a workpiece comprising:
a data processing system where numerical data corresponding to a model of the workpiece is stored;
means for determining coordinates of a plurality of points on a boundary of the workpiece, said boundary is parallel to a machine table;
means for interpolating the coordinates so as to determine a plurality of geometrical elements of the boundary;
means for computing a set of possible transformations on the basis of two of the geometrical elements determined on the boundary that correlates the plurality of the geometrical elements of the boundary of the workpiece to a plurality of corresponding geometrical elements represented by a corresponding boundary of the model; and
means for eliminating erroneous transformations from the set of possible transformations.

37. An apparatus for digitizing coordinates of a boundary of a workpiece comprising:
  means for moving a sensor along a first direction;
  means for changing the first direction of motion of the sensor by a predetermined angle after the sensor has traveled a predetermined distance;
  means for reversing the first direction of motion of the sensor if the sensor contacts the boundary of the workpiece; and
  means for determining coordinates of a plurality of points located on the boundary of the workpiece,
  wherein the motion of the sensor is programmed such that after the sensor contacts a given point, the sensor starts to move so as to return to the given point, and the sensor does not return to the given point if another boundary point is encountered by the sensor before the given point.

38. An apparatus for digitizing and modeling geometric features of a surface of a workpiece comprising:
  a data processing system;
  means for determining a set of coordinates of a plurality of points of the surface of the workpiece;
  means for computing a geometric representation of the surface such that a sum of squared distances from the plurality of points of the workpiece to the geometric representation of the surface is minimized;
  means for determining coordinates of a first point in the set which is removed from the geometric representation of the surface by a greater distance than any other point in the set;
  means for computing a new geometric representation of the surface on the basis of a new set, which is the set of coordinates of the plurality of points without the coordinates of said first point; and
  means for determining if the first point is erroneously measured on an incorrect surface by applying F-test analysis to a ratio of the sum of squared distances from the points in the set to the geometric representation of the surface and the sum of squared distances from the points of the new set of the new geometric representation of the surface.

39. For use in connection with a machine, said machine being a machine tool or an inspection system, a method for determining the position and orientation of a workpiece in relation to a known coordinate system in order to enable the machine tool to engage such workpiece accurately or to enable proper inspection of such workpiece by the inspection system, said machine tool or said inspection system employing a data processing system where numerical data corresponding to a model of such workpiece is stored, comprising the steps of:
  measuring, by means of at least one sensor, coordinates of a plurality of points on surfaces of the workpiece;
  determining an approximate transformation which correlates the coordinates of the plurality of points of the workpiece to a plurality of corresponding virtual surfaces represented by the model; and
  improving the accuracy of the approximate transformation so as to obtain an improved transformation which indicates the position and orientation of the workpiece with respect to the model, and in which the sum of the squared distances from the plurality of points of the workpiece to the corresponding virtual surfaces of the model is minimized, wherein the step of improving the transformation comprising:
  determining a plane $TP_i$, which is tangent to a virtual surface $S_i$ represented by the model, that corresponds to a surface of the workpiece where a point $P_i$ on the surface is measured, so that a point of tangency of $S_i$ and $TP_i$ is closer to $\bar{p}_i$ than any other point on $S_i$;
  computing a rotational transformation vector $\bar{r}$ and a translational transformation vector $\bar{v}$, such that after supplying a tangent transformation $T_{r,v}$ to each point $\bar{p}_i$, the sum of squared distances from each point $T_{r,v}(\bar{p}_i)$ having had the tangent transformation applied thereto, to the corresponding tangent plane $TP_i$ is minimized; and
  modifying the transformation by multiplying the transformation by the Euclidean transformation $U_{r,v}$, which is defined by the vectors $\bar{r}$ and $\bar{v}$;
  whereby the machine is controllable to engage or operate upon the workpiece with a tool, sensor or the like, on the basis of the improved transformation.

40. For use in connection with a machine, said machine being a machine tool or an inspection system, a method for determining the position and orientation of a workpiece in relation to a known coordinate system in order to enable the machine tool to engage such workpiece accurately or to enable proper inspection of such workpiece by the inspection system, said machine tool or said inspection system employing a data processing system where numerical data corresponding to a model of such workpiece is stored, comprising the steps of:
  measuring by means of at least one sensor coordinates of a plurality of points on surfaces of the workpiece;
  determining an approximate transformation which correlates the coordinates of the plurality of points of the workpiece to a plurality of corresponding virtual surfaces represented by the model;
  improving the accuracy of the transformation so as to obtain an improved transformation which indicates the position and orientation of the workpiece with respect to the model, and in which the sum of the squared distances from the plurality of points of the workpiece to the corresponding virtual surfaces of the model is minimized; and
  minimizing an objective function of the improved transformation so as to obtain a transformation which transforms the coordinates of the plurality of points so as to satisfy tolerance requirements of the workpiece stored in the data processing system;
  whereby the machine is controllable to engage or operate upon the workpiece with a tool, sensor or the like, on the basis of the improved transformation.

41. For use in connection with a machine, said machine being a machine tool or an inspection system, a method for determining the position and orientation of a workpiece in relation to a known coordinate system in order to enable the machine tool to engage such workpiece accurately or to enable proper inspection of such workpiece by the inspection system, said machine tool or said inspection system employing a data processing system where numerical data corresponding to a model of such workpiece is stored, comprising the steps of:
  measuring by means of at least one sensor, coordinates of a plurality of points on surfaces of the workpiece;
  determining an approximate transformation which correlates the coordinates of the plurality of points of the workpiece to a plurality of corresponding virtual surfaces represented by the mode;

improving the accuracy of the approximate transformation so as to obtain an improved transformation which indicates the position and orientation of the workpiece with respect to the model, and in which the sum of the squared distances from the plurality of points of the workpiece to the corresponding virtual surfaces of the model is minimized; and performing a reliability analysis of the improved transformation so as to determine a bound of an error of a computed position and orientation of the workpiece, which computed position and orientation are represented by the numerical data corresponding to the model transformed by an inverse of the improved transformation;

whereby the machine is controllable to engage or operate upon the workpiece with a tool, sensor or the like, on the basis of the improved transformation.

42. A method for determining the position and orientation of a workpiece having at least one planar surface using a machine employing a data processing system where numerical data corresponding to a model of the workpiece with a corresponding planar surface is stored, comprising the steps of:

moving a sensor according to a probing route lying in a probing plane parallel to the planar surface of the workpiece;

measuring coordinates of a plurality of points located on the probing route;

determining an approximate transformation which correlates the measured coordinates of pints located on the probing route to a boundary in the model corresponding to the probing plane of the workpiece, using the coordinates of the points that are measured at an initial stage of moving the sensor; and improving the accuracy of the approximate transformation on the basis of the coordinates of additional points measured on the probing route to obtain an improved transformation which indicates the position and orientation of the workpiece with respect to the model; and locating the position of a clamp by identifying at least one point which cannot be transformed by the improved transformation to a corresponding virtual surface represented by the model.

43. An apparatus for determining the position and orientation of a workpiece comprising:

a data processing system where numerical data corresponding to a model of the workpiece is stored;

means for determining coordinates of a plurality of points on a corresponding plurality of surfaces of the workpiece;

means for determining an approximate transformation which correlates the coordinates of the plurality of points of the workpiece to a plurality of corresponding virtual surfaces represented by the model;

means for improving the accuracy of the approximate transformation so as to obtain an improved transformation which indicates the position and orientation of the workpiece with respect to the model, and in which the sum of the squared distances from the plurality of points of the workpiece to the corresponding virtual surfaces of the model is minimized, wherein the means for improving the accuracy comprises:

means for determining a plane $TP_i$ which is tangent to a virtual surface $S_i$ represented by the model that corresponds to a surface of the workpiece where a point $\bar{p}_i$ on the surface is measured so that a point of tangency of $S_i$ and $TP_i$ is closer to $\bar{p}_i$ than any other point on $S_i$;

means for computing a rotational transformation vector $\bar{r}$ and a translational transformation vector $\bar{v}$, such that after applying a tangent transformation $T_{r,v}$ to each point $\bar{p}_i$ the sum of squared distances from each point $T_{r,v}(\bar{p}_i)$ having had the tangent transformation applied thereto, to the corresponding tangent plane $TP_i$ is minimized; and means for modifying the transformation by multiplying the transformation by the Euclidean transformation $U_{r,v}$, defined by the vectors $\bar{r}$ and $\bar{v}$.

44. An apparatus for determining a position and an orientation of a workpiece comprising:

a data processing system where numerical data corresponding to a model of the workpiece is stored;

means for determining coordinates of a plurality of points on a corresponding plurality of surfaces of the workpiece;

means for determining an approximate transformation which correlates the coordinates of the plurality of points of the workpiece to a plurality of corresponding virtual surfaces represented by the model;

means for improving the accuracy of the approximate transformation so as to obtain an improved transformation which indicates the position and orientation of the workpiece with respect to the model, and in which the sum of the squared distances from the plurality of points of the workpiece to the corresponding virtual surfaces of the model is minimized; and means for performing a reliability analysis of the improved transformation so as to determine a bound of an error of a computed position and orientation of the workpiece, which computed position and orientation is the numerical data corresponding to the model transformed by an inverse of the improved transformation.

45. An apparatus for determining the position and orientation of a workpiece comprising:

a data processing system where numerical data corresponding to a model of the workpiece is stored;

means for determining coordinates of a plurality of points on a corresponding plurality of surfaces of the workpiece;

means for determining an approximate transformation which correlates the coordinates of the plurality of points of the workpiece to a plurality of corresponding virtual surfaces represented by the model;

means for improving the accuracy of the approximate transformation so as to obtain an improved transformation which indicates the position and orientation of the workpiece with respect to the model, and in which the sum of the squared distances from the plurality of points of the workpiece to the corresponding virtual surfaces of the model is minimized; and means for minimizing an objective function of the improved transformation so as to obtain a transformation which transforms the coordinates of the points so as to satisfy tolerance requirements of the workpiece stored in the data processing system.

46. A method for determining the position and orientation of a workpiece using a machine employing a data processing system where numerical data corresponding to a model of the workpiece is stored, comprising the steps of:

measuring, by means of at least one sensor, coordinates of a plurality of points on surfaces of the workpiece;

determining an approximate transformation which correlates the coordinates of the plurality of points of the workpiece to a plurality of corresponding virtual surfaces represented by the model;

improving the accuracy of the approximate transformation so as to obtain an improved transformation which indicates the position and orientation of the workpiece with respect to the model, and in which the sum of the squared distances from the plurality of points of the workpiece to the corresponding virtual surfaces of the model is minimized;

modifying tool path data, stored in the data processing system for machining the workpiece, using the improved transformation.

47. An apparatus for determining the position and orientation of a workpiece comprising:

a data processing system where numerical data corresponding to a model of the workpiece is stored;

means for determining coordinates of a plurality of points on a corresponding plurality of surfaces of the workpiece;

means for determining an approximate transformation which correlates the coordinates of the plurality of points of the workpiece to a plurality of corresponding virtual surfaces represented by the model;

means for improving the accuracy of the approximate transformation so as to obtain an improved transformation which indicates the position and orientation of the workpiece with respect to the model, and in which the sum of the squared distances from the plurality of points of the workpiece to the corresponding virtual surfaces of the model is minimized; and means for modifying tool path data, stored in the data processing system for machining the workpiece, using the improved transformation.

* * * * *